(12) United States Patent
Watanabe

(10) Patent No.: US 8,849,504 B2
(45) Date of Patent: Sep. 30, 2014

(54) ELECTRONIC CONTROL APPARATUS FOR VEHICLES

(75) Inventor: Hirokazu Watanabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 1992 days.

(21) Appl. No.: 11/701,555

(22) Filed: Feb. 2, 2007

(65) Prior Publication Data

US 2007/0198874 A1 Aug. 23, 2007

(30) Foreign Application Priority Data

Feb. 3, 2006 (JP) .................................. 2006-027098

(51) Int. Cl.

| G06F 11/00 | (2006.01) |
|---|---|
| G06F 12/16 | (2006.01) |
| G07C 5/08 | (2006.01) |
| G06F 11/07 | (2006.01) |
| G05B 23/02 | (2006.01) |
| F02D 45/00 | (2006.01) |
| G06F 11/14 | (2006.01) |

(52) U.S. Cl.
CPC ............ G06F 11/0772 (2013.01); G07C 5/085 (2013.01); G06F 11/1441 (2013.01); G06F 11/0787 (2013.01); G06F 11/076 (2013.01); G06F 11/0739 (2013.01); G06F 11/0748 (2013.01)
USPC .......................................................... 701/36

(58) Field of Classification Search
CPC ............ G06F 11/0739; G06F 11/0748; G06F 11/076; G06F 11/0772; G06F 11/0787; G07C 5/085
USPC ........................ 318/568.1; 348/114, 143, 159; 379/101.01; 446/298, 379, 404; 700/94, 245, 246, 259, 264; 701/117, 701/118, 208, 213, 215, 36; 709/218, 223, 709/246; 710/11; 714/18; 901/47, 50
See application file for complete search history.

(56) References Cited

U.S. PATENT DOCUMENTS

| 4,532,594 | A | * | 7/1985 | Hosaka et al. ................ 701/114 |
|---|---|---|---|---|
| 4,535,455 | A | | 8/1985 | Peterson |

(Continued)

FOREIGN PATENT DOCUMENTS

| EP | 2000874 A2 * | 12/2008 | ............. G05B 23/02 |
|---|---|---|---|
| JP | 02-067658 | 3/1990 | |

(Continued)

OTHER PUBLICATIONS

Extended European search report dated Apr. 21, 2008 in European Application No. 07 002 311.4-1225.

*Primary Examiner* — Khoi Tran
*Assistant Examiner* — Dale Moyer
(74) *Attorney, Agent, or Firm* — Nixon & Vanderhye PC

(57) ABSTRACT

An electronic control apparatus for vehicles is provided. The apparatus comprises a volatile memory storing control data therein, a control component performing control necessary to the vehicle using the control data in the volatile memory, and an update component updating the control data in the volatile memory based on controlled results. The apparatus further comprises a detecting component, recording component and transmitting unit. The detecting component detects an abnormality occurring in the volatile memory and the recording component correlates a history of the detected abnormality with information indicating a region of the volatile memory in which the abnormality occurs and records information indicating the abnormality history. The transmitting unit generates a transmission signal indicating the abnormality history on the basis of the information indicating the recorded history and transmitting the transmission signal to an external device via a communication interface.

31 Claims, 21 Drawing Sheets

(56) References Cited

U.S. PATENT DOCUMENTS

| | | | |
|---|---|---|---|
| 4,608,687 A * | 8/1986 | Dutton | 714/710 |
| 4,617,660 A * | 10/1986 | Sakamoto | 714/6.2 |
| 5,522,034 A | 5/1996 | Watari et al. | |
| 5,892,896 A * | 4/1999 | Shingo | 714/8 |
| 6,401,163 B1 | 6/2002 | Kondo et al. | |
| 6,505,306 B1 * | 1/2003 | Blackmon et al. | 714/6.1 |
| 6,560,725 B1 | 5/2003 | Longwell et al. | |
| 6,996,463 B2 * | 2/2006 | Kondo | 701/29 |
| 2003/0171858 A1 * | 9/2003 | Kondo | 701/29 |
| 2008/0306650 A1 * | 12/2008 | Nakagaki | 701/30 |

FOREIGN PATENT DOCUMENTS

| | | |
|---|---|---|
| JP | 09-146849 | 6/1997 |
| JP | 10-299565 | 11/1998 |
| JP | 11-039231 | 2/1999 |
| JP | 11-184762 | 7/1999 |
| JP | 2003-207192 | 7/2003 |
| JP | 2003-263372 | 9/2003 |
| JP | 2002 332 3353 | 11/2003 |
| JP | 2004-278483 | 10/2004 |

* cited by examiner

FIG. 18

| UNIQUE ID TYPE | RAM CORRUPTION ABNORMALITY | WRITING ABNORMALITY | POWER SOURCE INSTABILITY ABNORMALITY | MEMORY CELL ABNORMALITY |
|---|---|---|---|---|
| UNIQUE ID OF DATA STORING REGION (LOW IMPORTANCE LEVEL) | V2[1,1] | V2[1,2] | V2[1,3] | V2[1,4] |
| UNIQUE ID OF DATA STORING REGION (HIGH IMPORTANCE LEVEL) | V2[2,1] | V2[2,2] | V2[2,3] | V2[2,4] |
| UNIQUE ID OF ALTERNATIVE DATA STORING REGION | V2[3,1] | V2[3,2] | V2[3,3] | — |
| UNIQUE ID OF ABNORMALITY HISTORY STORING REGION | V2[4,1] | V2[4,2] | V2[4,3] | — |

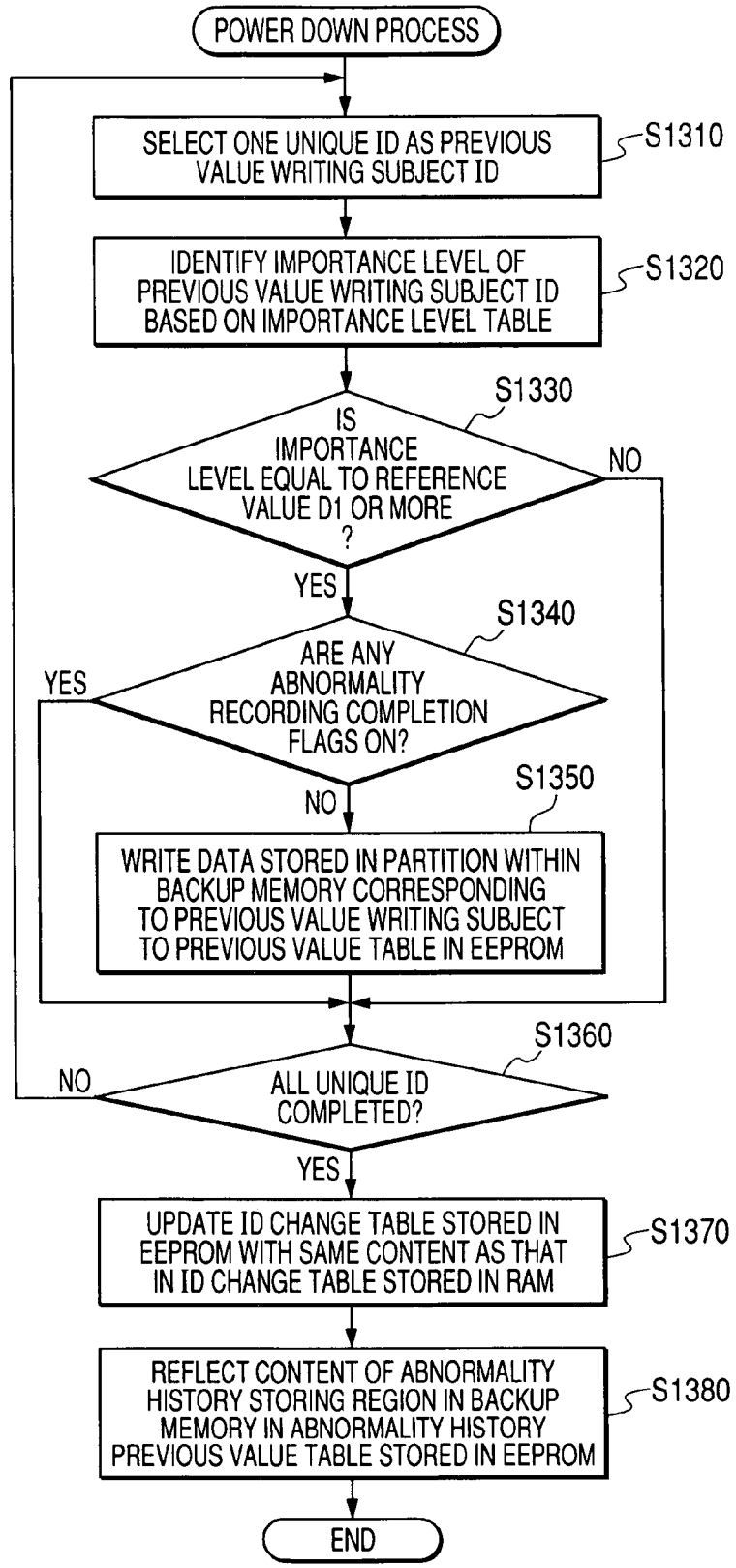

ELECTRONIC CONTROL APPARATUS FOR VEHICLES

CROSS-REFERENCE TO RELATED APPLICATION

This application is based on and claims the benefit of priority from earlier Japanese Patent Application No. 2006-027098 filed on Feb. 3, 2006, the description of which is incorporated herein by reference.

BACKGROUND OF THE INVENTION

1. Field of the Invention

The present invention relates to an electronic control apparatus used in a vehicle, and in particular, to an electronic control apparatus controlling the vehicle based on control data stored in a volatile memory and updates control data based on a control result.

2. Description of the Related Art

Conventionally, an electronic control apparatus including a learning function is known as an electronic control apparatus used in a vehicle. The electronic control apparatus stores and holds control data in a backup random access memory (RAM), controls the vehicle based on the control data, and updates the control data stored in the backup RAM based on a control result. Power is constantly supplied to the backup RAM by a car battery. A following electronic control apparatus is known as the above-described type of electronic control apparatus. The electronic control apparatus detects an abnormality (or malfunction) in the backup RAM. When the abnormality is detected, the electronic control apparatus illuminates a warning lamp and notifies a vehicle occupant of the abnormality (for example, refer to Japanese Patent Laid-Open Publication No. Heisei 11-184762).

A following electronic control apparatus is known as an electronic control apparatus that can detect abnormalities in a memory. The electronic control apparatus detects an abnormality in data stored in a read-only memory (ROM). When the abnormality is detected, the electronic control apparatus executes a fail-safe process, stores data related to the abnormality, and outputs the data to an external device as required (for example, refer to Japanese Patent Laid-Open Publications No. Heisei 10-299565 and 11-039231).

However, when an abnormality is detected in a volatile memory storing control data, the conventional device merely illuminates the warning lamp and notifies the vehicle occupant of the abnormality. Therefore, the vehicle occupant, a maintenance worker, and the like cannot know the details of the abnormality in the volatile memory. As a result, appropriate measures cannot be taken to fix the abnormality.

The volatile memory, in particular, cannot store and hold data with more stability than the ROM since the volatile memory is influenced by power supply and the like. When control data is repeatedly updated, incidental abnormality easily occurs during the update. Therefore, if the details of the abnormality in the volatile memory cannot be known, the vehicle occupant, the maintenance worker, and other persons cannot even know whether the abnormality is permanent. As a result, appropriate measures cannot be taken to fix the abnormality.

SUMMARY OF THE INVENTION

The present invention has been achieved in light of the above-described circumstances. A primary object of the invention is to provide an electronic control apparatus that is able to provide detailed information related to an abnormality in a volatile memory storing control data to an external device.

A secondary object of the invention is to provide an electronic control apparatus that is able to provide information related to an abnormality in a volatile memory to an external device and internally fix certain abnormalities.

To achieve the above-described objects, an electronic control apparatus used in a vehicle according to the present invention controls the vehicle based on control data stored in a volatile memory and updates the control data based on the control result. In the electronic control apparatus, a detecting component detects an abnormality occurring in the volatile memory. A recording component correlates a history of abnormalities detected by the detecting component with information indicating regions in which the abnormalities occur, and records the history of abnormalities.

When the volatile memory is configured to constantly receive power supplied from a car battery and constantly record and hold own data, regardless of an ON/OFF operation of an ignition switch, the recording component can record the history of abnormalities in the volatile memory (a first aspect of the present invention). When the electronic control apparatus includes a non-volatile memory that can electrically rewrite data, the recording component can record the history of abnormalities in the non-volatile memory (a second aspect of the present invention).

The electronic control apparatus includes a communication interface that can communicate with an external device. A transmitting unit generates a transmission signal indicating the abnormality history of the volatile memory, based on the history recorded by the recording component and transmits the transmission signal to the external device via the communication interface.

The electronic control apparatus configured as such (the first and second aspects of the present invention) can record the abnormality history in the volatile memory or the non-volatile memory, regardless of the ON/OFF operation of the ignition switch. The electronic control apparatus can accumulate the abnormality histories over a long period of time and provide the accumulated abnormality histories to the external device. When recording the abnormality history, the electronic control apparatus correlates the abnormality history with information indicating an occurrence region and stores the abnormality history. Therefore, the electronic control apparatus provides the external device with the histories of the abnormalities, in addition to the information indicating the regions in which the abnormalities have occurred.

The conventional electronic control apparatus does not have a function that correlates the abnormality history of the volatile memory with the information indicating the occurrence regions, records the abnormality history, and provides the abnormality histories to the external device over a long period of time. Therefore, compared to the conventional invention, the present invention can provide more detailed information that is useful in analyzing abnormalities, such as whether an abnormality is permanent, to the external device. As a result, according to the invention, a user can understand the details of the abnormality in the volatile memory via the external device and perform the appropriate process to fix the abnormality. Examples of the external device include an external center communicably connected to the communication interface via a wireless communication network or a fault diagnosis tester (so-called "diag tester" or "diagnostic testing tool") used on a vehicle communicably connected to the communication interface via an in-vehicle local area network (LAN).

The transmitting unit can be configured to periodically generate the transmission signal indicating the abnormality history and transmit the transmission signal to the external device. However, the abnormality history is more preferably configured as follows. When an abnormality history transmission request signal is received from the external device via the communication interface, the transmitting unit generates the transmission signal indicating the abnormality history and transmits the transmission signal to the external device that is the source of the transmission request. The electronic control apparatus configured as such (a third aspect of the present invention) can efficiently provide the external device with the abnormality history in response to the request from the external device.

The transmitting unit can be configured to generate a transmission signal indicating all histories recorded by the recording component, when the transmission request signal is received from the external device. In addition, the transmitting unit is more preferably configured as follows.

The transmission request signal is configured to include information specifying the occurrence region of the abnormality. When the abnormality history transmission request signal is received from the external device via the communication interface, the transmitting unit generates a transmission signal indicating a history of an abnormality that has occurred in the region specified by the received transmission request signal, among the histories recorded by the recording component, and transmits the transmission signal to the external device that is the source of the transmission request signal.

The electronic control apparatus configured as such (a fourth aspect of the present invention) can selectively transmit requested information in response to a request from the external device. The user can obtain only the required information via the external device and efficiently investigate the cause of the abnormality.

Depending on the content of the abnormality, the cause of the abnormality can be more efficiently investigated by a replication test and an analysis of the abnormality history generated during the replication test. Therefore, the electronic control apparatus can include a clearing component. When the electronic control apparatus receives an abnormality history clearing request signal from the external device via the communication interface, the clearing component clears the abnormality history recorded by the recording component. The electronic control apparatus including the clearing component (a fifth aspect of the present invention) can clear the abnormality history recorded by the recording component via the external device. The user can perform the replication test after the abnormality history recorded by the recording component is cleared via the external device, thereby efficiently performing the investigation into the cause of the abnormality.

The clearing component can be configured to clear all histories recorded by the recording component, when the clearing request signal is received. However, the clearing component is more preferably configured as follows. The clearing request signal is configured to include information specifying the abnormality occurrence region. When the abnormality history clearing request signal is received from the external device via the communication interface, the clearing component clears a history of an abnormality recorded by the recording component in correlation with the information indicating the abnormality occurrence region specified by the received clearing request signal, among the histories recorded by the recording component.

The electronic control apparatus configured as such (a sixth aspect of the present invention) can perform the clearing operation in detail, via the external device. The user does not have to clear histories that are not required to be cleared. Therefore, the electronic control apparatus is convenient to the user. Compared to the electronic control apparatus according to the sixth aspect of the present invention, the electronic control apparatus that clears all histories recorded by the recording component when the clearing request signal is received is advantageous in that all histories can be cleared easily.

The recording component can be configured to record an abnormality occurrence date or the like, in correlation with the information indicating the abnormality occurrence region, as the history of the abnormality detected by the detecting component. However, the recording component is more preferably configured as follows. The recording component records the abnormality occurrence frequency, in correlation with the information indicating the abnormality occurrence region, as the history of the abnormality detected by the detecting component. According to the electronic control apparatus configured as such (a seventh aspect of the present invention), the external device can easily know the abnormality occurrence frequency of respective regions within the volatile memory and easily judge whether the abnormalities in the respective regions are permanent abnormalities or incidental abnormalities.

In the electronic control apparatus, the detecting component can detect plural types of abnormalities. The recording component can record the occurrence frequencies of various abnormalities, by each region of the volatile memory in which an abnormality has been detected by the detecting component. The electronic control apparatus configured as such (an eighth aspect of the present invention) can provide the external device with information indicating the occurrence frequency of the plural types of abnormalities, by each region of the volatile memory. The user can efficiently perform the investigation into the cause of the abnormality based on the information.

The recording component is preferably configured as follows. The recording component records the occurrence frequency in each abnormality occurrence region and the occurrence frequency of each type of abnormality, regarding each abnormality detected by the detecting component during a period from the start of a vehicle control to the completion of the vehicle control, by increasing the abnormality occurrence frequency once, by one count, for each abnormality occurrence region and each abnormality type. The vehicle control is started and completed by operations performed by the vehicle occupant.

If the electronic control apparatus is configured to record the abnormality occurrence frequency once during the period from the start of the vehicle control to the completion of the vehicle control by the ignition operation performed by the vehicle occupant (one vehicle operating period), the processing load from the abnormality history recording operation placed within the electronic control apparatus can be suppressed. Even if the abnormality occurrence frequency count during one vehicle operating period is increased by the detection frequency, the information most likely becomes meaningless if the user does not know the details of the operation state of the vehicle. Therefore, the electronic control apparatus (a ninth aspect of the present invention) can efficiently record the abnormality occurrence frequency.

As described in a tenth aspect of the present invention, the electronic control apparatus preferably includes a fail-safe processing component. When the detecting component detects an abnormality, the fail-safe processing component executes a predetermined fail-safe process for the detected abnormality. The fail-safe processing component can be configured to switch the content of the fail-safe process to be executed, depending on the occurrence region of the detected abnormality (an eleventh aspect of the present invention).

When fail-safe processes having the same contents are executed regardless of the importance of the control data stored in the region in which the abnormality has been detected, the appropriate fail-safe process may not be executed for control data having a high level of importance. However, if the electronic control apparatus is configured to switch the content of the fail-safe process to be executed depending on the occurrence region of the detected abnormality, the appropriate fail-safe process can be executed depending on the importance of the control data.

For example, when the region in which a writing abnormality has occurred is a region storing control data having a high level of importance, the electronic control apparatus executes a fail-safe process that secures a memory region for the control data in a separate region within the volatile memory. When the region in which a writing abnormality has occurred is a region storing control data having a low level of importance, the electronic control apparatus executes a fail-safe process that does not secure the memory region for the control data in a separate region and outputs an initial value of the control data as a returned value when reading the control data. If the electronic control apparatus is configured as such, a more appropriate fail-safe process can be executed for writing abnormalities of control data having a high level of importance.

The fail-safe processing component can be configured to switch the content of the fail-safe process to be executed depending on the occurrence frequency of the abnormalities that have occurred in the past in the same region as the detected abnormality. The electronic control apparatus having a fail-safe processing component configured as such (a twelfth aspect of the present invention) can switch the content of the fail-safe process depending on whether the abnormality is a permanent abnormality or an incidental abnormality and execute a fail-safe process appropriate for the property of the abnormality.

For example, even when a control data writing abnormality occurs, if the occurrence frequency of the abnormality is less than a threshold value, the electronic control apparatus executes the fail-safe process that does not secure the memory region for the control data in a separate region and outputs the initial value of the control data as the returned value when reading the control data. If the occurrence frequency of the abnormality is equal to or more than the threshold value, the electronic control apparatus executes the fail-safe process that secures the memory region for the control data in a separate region within the volatile memory, under the premise that the writing abnormality is a permanent abnormality. As a result, the electronic control apparatus can handle the abnormality in a manner appropriate for the property of the abnormality.

The fail-safe processing component can be configured to switch the content of the fail-safe process to be executed depending on the occurrence region of the detected abnormality and the occurrence frequency of the abnormalities that have occurred in the region in the past. The electronic control apparatus configured as such (a thirteenth aspect of the present invention) can appropriately switch the content of the fail-safe process depending on whether the abnormality is an incidental abnormality or a permanent abnormality or depending on whether the region in which the abnormality has occurred is a region storing important control data. The electronic control apparatus can execute the appropriate fail-safe process in each case.

In the electronic control apparatus described above, the control data can include check data used to detect illegal data. The detecting component can detect illegal data in each control data stored in the volatile memory as the abnormality, based on the check data. The electronic control apparatus configured as such (a fourteenth aspect of the present invention) can record the abnormality histories related to illegal data in each control data and provide the external device with the abnormality histories.

The fail-safe processing component can be configured to execute a following process as the fail-safe process for illegal data. The process updates the control data from which the illegal data has been detected to the control data prior to the occurrence of the illegal data. The electronic control apparatus configured as such (a fifteenth aspect of the present invention) can fix the abnormality caused by illegal data internally, thereby enhancing vehicle safety.

The electronic control apparatus sometimes controls the vehicle using a plurality of control data. If the plurality of control data are not a normal combination of values, the electronic control apparatus may not be able to control the vehicle normally. Therefore, each control data stored in the volatile memory is grouped by control data types. The fail-safe processing component can be configured to execute a following process as the fail-safe process for illegal data. The process updates the control data from which the illegal data has been detected to the control data prior to the occurrence of the illegal data and updates each control data belonging to the same group as the control data from which the illegal data has been detected to control data that is paired with the control data prior to the occurrence of the illegal data.

When illegal data occurs in any one of the control data among the control data required to control the vehicle, the electronic control apparatus configured as such (a sixteenth aspect of the present invention) updates all conversion data within the group. Therefore, the control data within the group can be prevented from becoming incommensurable and unstable control of the vehicle can be prevented.

Control data set at the time of shipment can be given as control data prior to the occurrence of the illegal data. However, when the illegal data occurs, if the corresponding data is returned to the values set at the time of shipment, learning results of the control data are lost.

Therefore, the electronic control apparatus including the non-volatile memory includes a backup processing unit. The backup processing unit stores each control data stored in a region within the volatile memory in which an abnormality has not been detected by the detecting component as backup in the non-volatile memory. The fail-safe processing component is configured to execute the following process as the fail-safe process for illegal data. The process updates the control data from which the detecting component has detected the illegal data to the control data prior to the abnormality detection stored in the non-volatile memory by the backup processing unit.

The electronic control apparatus configured as such (a seventeenth aspect of the present invention) does not require the control data to be returned to the values set at the time of shipment, even when the control data is corrupted. Therefore, the electronic control apparatus appropriately controls the vehicle based on learning results.

In the electronic control apparatus including the volatile memory that constantly receives power supplied from the car battery, the volatile memory holds the control data. Therefore, the electronic control apparatus normally neither reads the control data from the non-volatile memory or the like nor sets the read control data in the volatile memory at the start of the vehicle control. Thus, when the detecting component is operated after removing and attaching the car battery in the electronic control apparatus including the above-described type of volatile memory, the abnormality detecting device may detect volatilization of the control data caused by the removal and attachment of the car battery as illegal data.

Therefore, in the above-described type of volatile memory, the detecting component performs illegal data detection on all control data at the start of the vehicle control. Based on the results of the detection performed by the detecting component at the start of the vehicle control, a determining component determines whether the car battery has been removed or attached. In the electronic control apparatus, the recording component can be configured to not record the history of the abnormality related to the illegal data detected by the detecting component at the start of the vehicle control, when the determining component determines that the car battery has been removed or attached.

The electronic control apparatus configured as such (eighteenth and nineteenth aspects of the present invention) can ignore abnormality detections caused by the removal or attachment of the car battery. Therefore, the vehicle occupant, the worker, and the like can be prevented from mistakenly thinking that an abnormality has been detected in the electronic control apparatus due to external notification of the abnormality.

When the control data stored in the volatile memory is updated, the detecting component can be configured to perform the illegal data detection on the control data to be updated, before the data update. Even when the illegal data occurs in the control data prior to data update, the electronic control apparatus including the detecting component configured as such (a twelfth aspect of the present invention) can detect all illegal data abnormalities without fail, before the illegal data is fixed by the data update. Therefore, the electronic control apparatus can accurately record the abnormality histories.

The detecting component can be configured to detect the control data writing abnormality by judging whether the control data has been overwritten with intended control data when updating the control data stored in the volatile memory. The electronic control apparatus including the detecting component configured as such (a twenty-first aspect of the present invention) can record the histories related to writing abnormalities for each control data and provide the external device with the histories.

The fail-safe processing component can be configured to execute the following process as the fail-safe process for the writing abnormality. The process changes the storing region of the control data from which the writing abnormality has been detected to a separate region within the volatile memory. The electronic control apparatus configured as such (a twenty-second aspect of the present invention) can subsequently prevent the control data from not being overwritten due to the writing abnormality and appropriately control the vehicle based on the learning results.

The fail-safe processing component can be configured to execute the following process as the fail-safe process for the writing abnormality. When a readout instruction is given for the control data from which the writing abnormality has been detected, the process outputs the initial values of the control data as the result in response to the readout instruction. Data content of the control data in the region in which the writing abnormality has occurred is very likely to be abnormal, as well. Therefore, the electronic control apparatus including the fail-safe processing component (a twenty-third aspect of the present invention) is not required to control the vehicle based on abnormal control data, at the least, and the vehicle safety can be enhanced.

The value set at the time of shipment can be given as the initial value. However, after a writing abnormality occurs, if the corresponding data is returned to the values set at the time of shipment, the learning results of the control data are lost.

Therefore, the fail-safe processing component in the electronic control apparatus including the backup processing unit is configured as follows. The fail-safe processing component executes the following process as the fail-safe process for the writing abnormality. When the readout instruction is given for the control data from which the writing abnormality has been detected, the process outputs the relevant control data prior to the abnormality detection stored in the non-volatile memory by the backup processing unit as the result in response to the readout instruction. The electronic control apparatus configured as such (a twenty-fourth aspect of the present invention) can more appropriately control the vehicle based on the learning results than the electronic control apparatus using the values set at the time of shipment.

The electronic control apparatus preferably includes a warning determining component and a warning controlling unit. The warning determining component determines whether a notification of the abnormality is required to be given to the vehicle occupant, based on the histories recorded by the recording component. When the warning determining component determines that the notification is required, the warning controlling unit controls a warning device provided within the vehicle and notifies the vehicle occupant of the abnormality. The electronic control apparatus configured as such (a twenty-fifth aspect of the present invention) can warn the vehicle occupant of the abnormality at an early stage when an abnormality having a high occurrence frequency is detected and not warn the vehicle occupant of the abnormality when an incidental abnormality occurs. Therefore, the electronic control apparatus does not cause the vehicle occupant alarm.

The volatile memory stores various data, such as the control data having a high importance level and the control data having a low importance level. The control data having a high importance level has a significant influence on the behavior of the vehicle when an abnormality occurs. The control data having a low importance level does not have a significant influence on the behavior of the vehicle when an abnormality occurs. Therefore, the electronic control apparatus judges whether a notification of the abnormality is required by respectively differentiating between the memory region of the control data having a high importance level and the memory region of the control data having a low importance level. In other words, the warning determining component determines whether the notification of the abnormality is required to be given to the vehicle occupant, based on different criteria for each abnormality occurrence region. The electronic control apparatus configured as such (a twenty-sixth aspect of the present invention) can appropriately notify the vehicle occupant of a serious abnormality.

BRIEF DESCRIPTION OF THE DRAWINGS

In the accompanying drawings:

FIG. 18 is an explanatory diagram of a configuration of a second threshold setting table stored in the ROM;

FIG. 19 is a flowchart of a power-down process performed by the writing and reading control component;

DETAILED DESCRIPTION OF THE PREFERRED EMBODIMENT

Hereinafter, an embodiment of the present invention will now be explained with reference to the attached drawings.

Figure 1A:
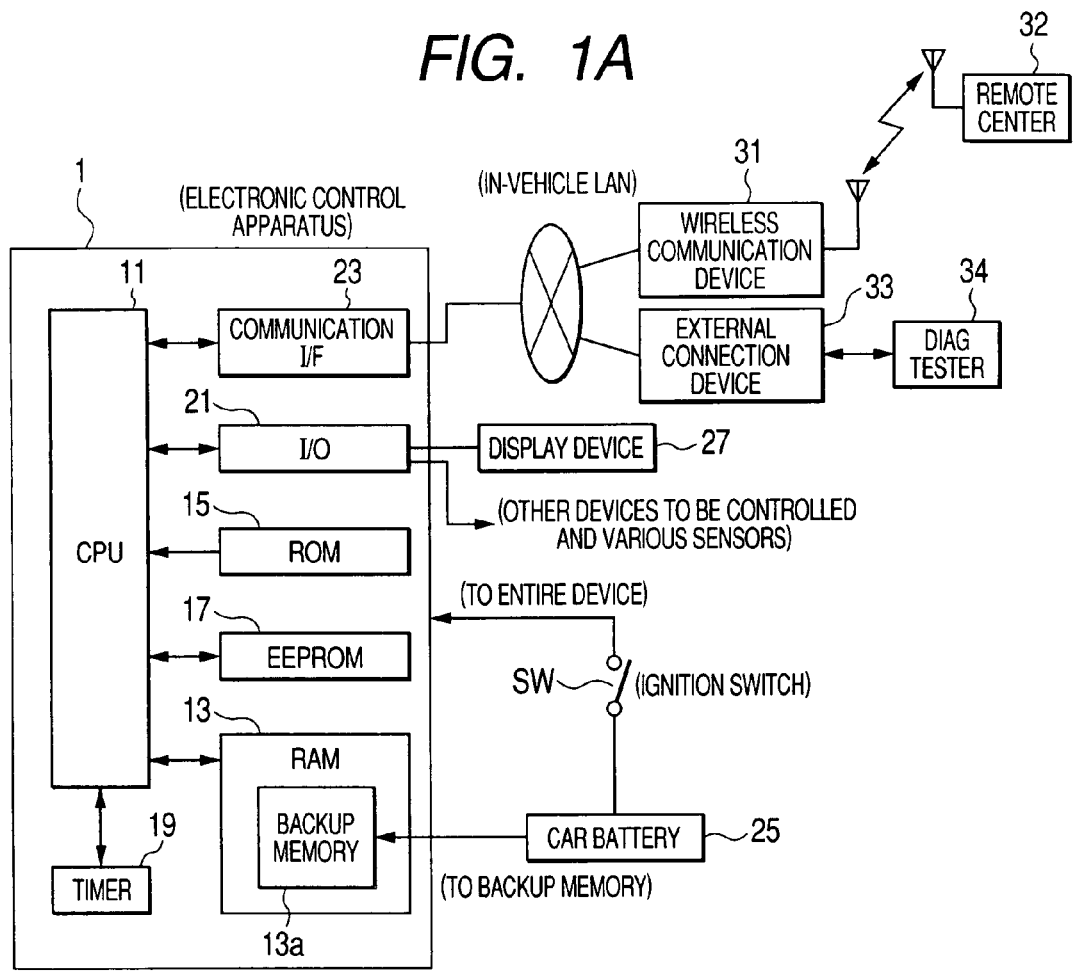
FIG. 1A is a block diagram of a configuration of an electronic control apparatus according to an embodiment of the present invention.
Figure 1B:
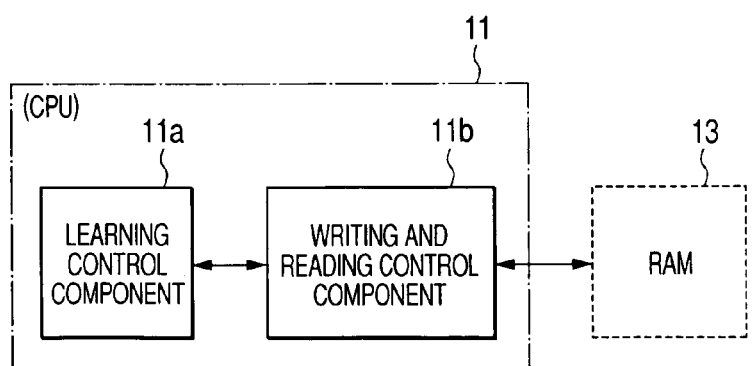
FIG. 1B is a functional block diagram of functions actualized by a CPU in the embodiment.

FIG. 1A is a block diagram of a configuration of an electronic control apparatus 1 according to the present invention, while FIG. 1B is a functional block diagram of some functions actualized by a central processing unit (CPU) 11 in the electronic control apparatus 1.

As shown in FIG. 1A, the electronic control apparatus 1 according to the present embodiment is an electronic control apparatus for vehicles mounted on a vehicle. The electronic control apparatus 1 includes a CPU 11, a RAM 13, a ROM 15, an electronically erasable programmable read-only memory (EEPROM) 17, a timer 19, an input/output device (I/O) 21, and a communication interface 23. The RAM 13 is a volatile memory used as a work region when a program is being run. The ROM 15 stores various programs run by the CPU 11. The EEPROM 17 is a non-volatile memory than can electrically rewrite data. The I/O 21 is electronically connected to various sensors and the like. The sensors and the like detect the states of the vehicle and devices to be controlled, such as various actuators driving the vehicle. The communication interface 23 can communicate with a device outside of the vehicle, via an in-vehicle LAN.

Specifically, an electronic control apparatus used for engine control can be given as the electronic control apparatus 1. When the electronic control apparatus 1 is the electronic control apparatus for engine control, an igniter, an injector, and the like can be given as the devices to be controlled.

In the electronic control apparatus 1, when an ignition switch SW is turned on via an ignition switch operating unit provided in the driver's seat, power is supplied within the entire the device from a car battery 25. Each unit within the device starts up.

When the ignition switch SW is turned on, the CPU 11 runs a program stored in the ROM 15 and functions as a learning control component (unit) 11a and a writing and reading control component (unit) 11b. Specifically, the learning control component 11a controls various actuators and performs vehicle control, based on the control data stored in the RAM 13 (data indicating control parameters). In addition, the learning control component 11a updates the control data stored in the RAM 13 via the writing and reading control component 11b, in accordance with a control result indicated by an output signal from a sensor. The writing and reading control component 11b performs a reading process and a writing process. The writing and reading control component 11b receives a readout instruction or a writing instruction from the learning control component 11a, and writes the control data in the RAM 13 or reads the control data from the RAM and inputs the read control data into the learning control component 11a.

Figure 2:
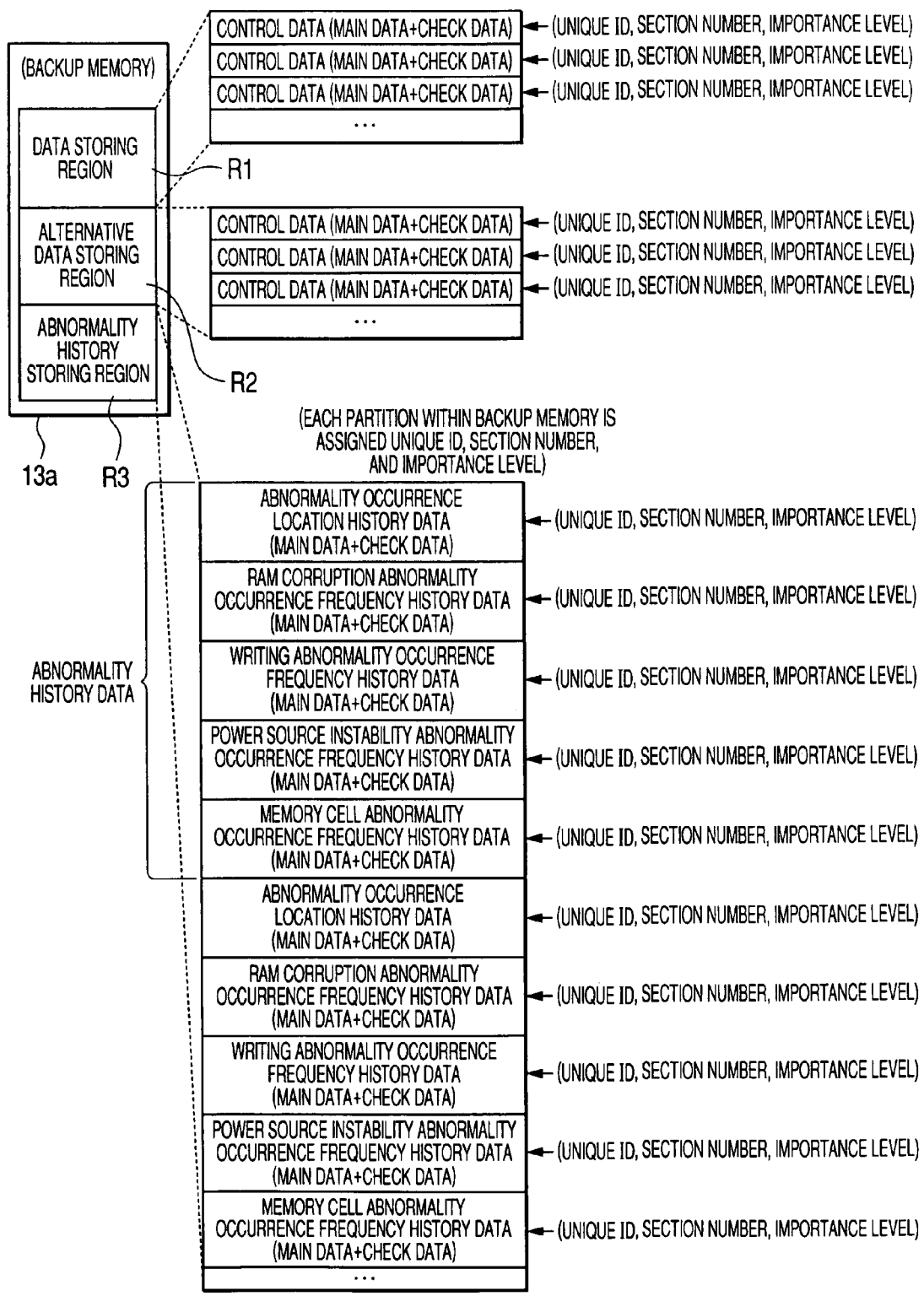
FIG. 2 is an explanatory diagram of a data configuration of a backup memory in the embodiment.

The RAM 13 is directly connected to the car battery 25. The RAM 13 has a region that constantly received power supplied from the car battery 25, regardless of the state of the ignition switch SW. In other words, a portion of the RAM 13 functions as a backup memory 13a. The backup memory 13a receives power supplied from the car battery 25, regardless of whether the ignition switch is turned ON or OFF, and constantly stores and holds predetermined data. The control data, abnormality (malfunction) history data, and the like are recorded in the backup memory 13a. The abnormality history data indicates the history of an abnormality that has occurred within the backup memory 13a. FIG. 2 is an explanatory diagram of a data configuration of the backup memory 13a.

The backup memory 13a include a data storing region R1, an alternative data storing region R2, and an abnormality history storing region R3. The data storing region R1 stores control data. Each control data stored in the data storing region R1 includes main data and check data. The check data is used to detect corruption of the main data. Data indicating a total value of all bits within the main data, mirror data in which all bits within the main data are inverted, and the like can be given as the check data.

The data storing region R1 is partitioned into areas having a fixed number of bytes, accommodating each control data. Each control data is written into the same partition within the data storing region R1 by an operation performed by the writing and reading control component 11b. A unique ID (identification) is assigned to each partition. The electronic control apparatus 1 according to the embodiment uses the unique ID and reads or writes data (details will be described hereafter).

When an abnormality occurs in the data storing region R1, the alternative data storing region R2 alternatively stores the control data stored in the partition in which the abnormality occurred. The alternative data storing region R2 is partitioned in the same manner as the data storing region R1. When the abnormality occurs in the data storing region R1, corresponding control data is written in each partition. Each partition is assigned a unique ID, as in the data storing region R1.

The abnormality history storing region R3 stores abnormality history data indicating the histories of the abnormalities that have occurred in the data storing region R1 and the alternative data storing region R2. The abnormality history data includes history data indicating the unique ID of the location in which the abnormality has occurred (hereinafter, referred to as "abnormality occurrence location history data"), history data indicating the occurrence frequency of RAM corruption abnormality (namely, illegal data) (hereinafter, referred to as "RAM corruption abnormality occurrence frequency history data"), history data indicating the occurrence frequency of writing abnormality (hereinafter, referred to as "writing abnormality occurrence frequency history data"), history data indicating power source instability abnormality (hereinafter, referred to as "power source instability abnormality occurrence frequency history data"), and history data indicating the occurrence frequency of memory cell abnormality (hereinafter, referred to as "memory cell abnormality occurrence frequency history data"). Each history data includes the main data and the above-described check data.

The abnormality history storing region R3 is partitioned into areas having a fixed number of bytes, accommodating each history data. A unique ID is assigned to each partition, as in the data storing region R1. The abnormality history data, formed from a group of history data, is written by the writing and reading control component 11b spread over a plurality of partitions (five partitions in the embodiment) that are consecutive in a memory address direction.

Figure 3:
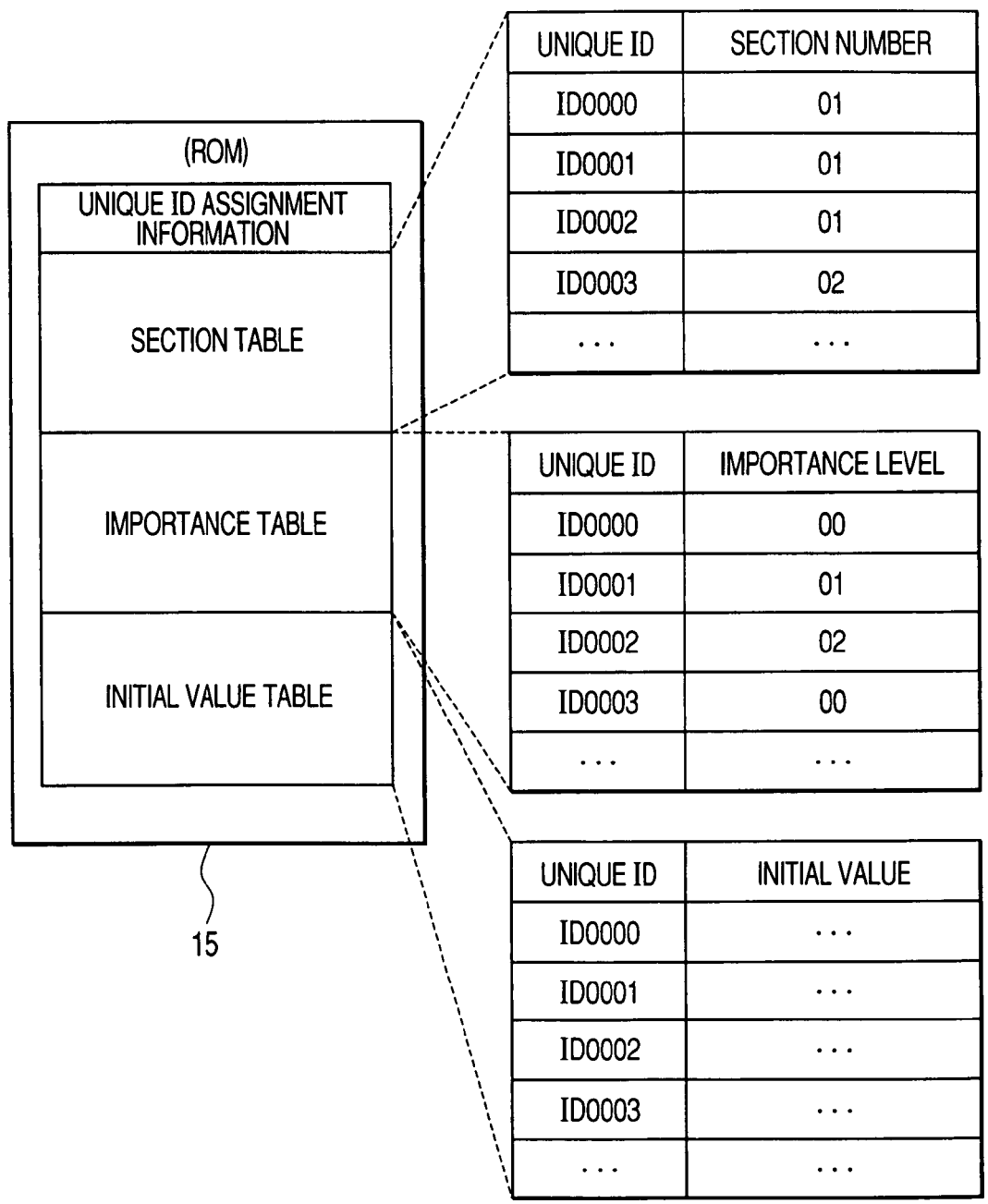
FIG. 3 is an explanatory diagram of a data configuration of a ROM in the embodiment.

At the same time, the ROM 15 includes unique ID assignment information, a section table, an importance table, and an initial value table. The unique ID assignment information indicates the correspondence between the unique ID and the memory address. FIG. 3 is an explanatory diagram of a data configuration of the ROM 15.

The section table defines the group to which each control data and history data belongs. The section table has a record for each unique ID of each partition assigned to the backup memory 13a. A section number indicating the group to which each control data and history data belongs is written in the record. Specifically, according to the embodiment, the section table is generated at the planning stage to assign the same group to data requiring overwriting at the same time, when the abnormality occurs. However, according to the embodiment, a session number differing from the session number assigned to the partitions within the alternative data storing region R2 is assigned to each partition in the data storing region R1 and the abnormality history storing region R3.

The importance table defines the importance level of each control data and history data. The importance table has a record for each unique ID of each partition assigned to the backup memory 13a. A value indicating the importance level is written in the record. The initial value table indicates the initial value (the value set at the time of shipment) of each control data. The initial value is written for each unique ID of each partition.

Figure 4:
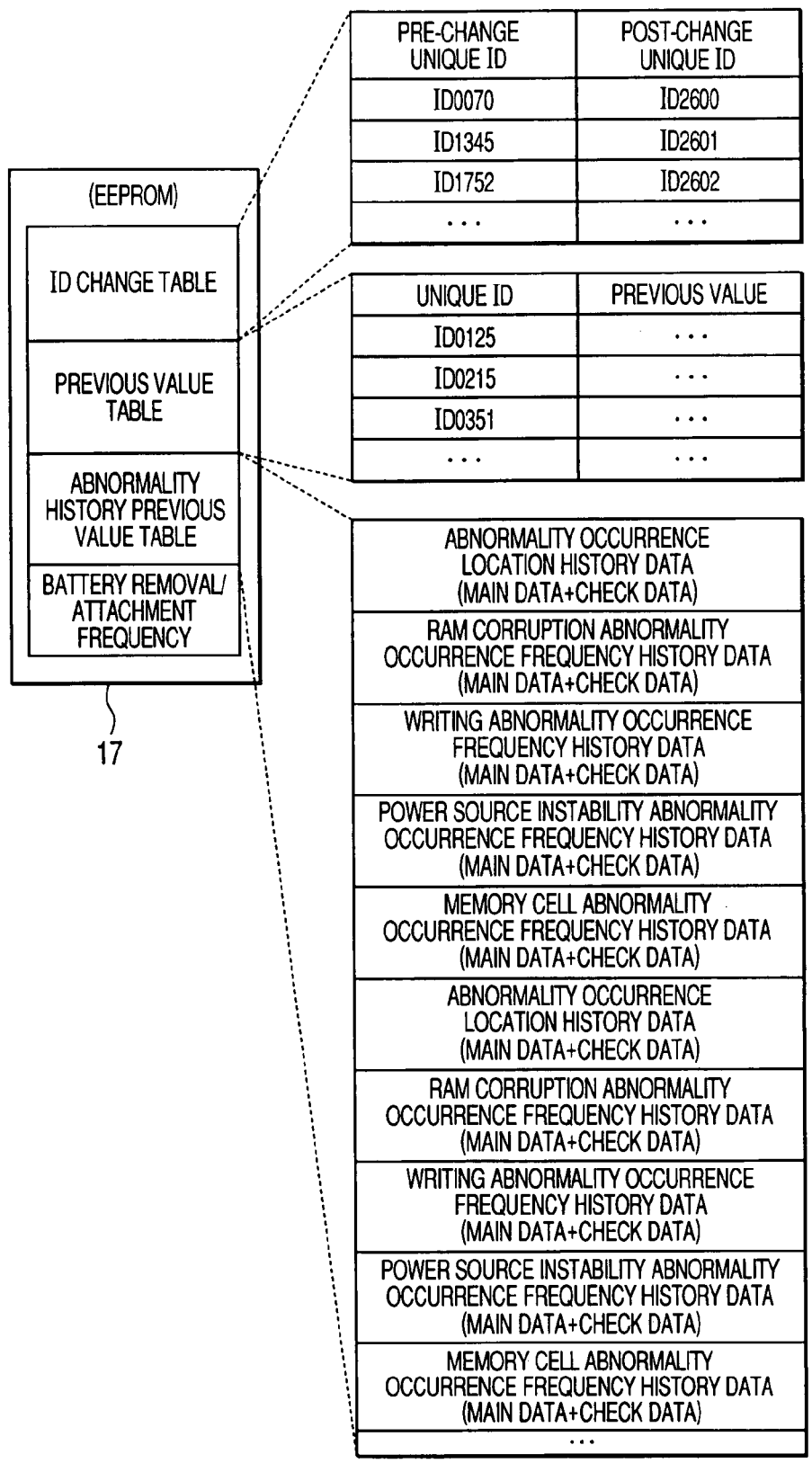
FIG. 4 is an explanatory diagram of a data configuration of an EEPROM in the embodiment.

As shown in FIG. 4, the EEPROM 17 is used as a memory storing an ID change table, a previous value table, an abnormality history previous value table, and data indicating the removal/attachment frequency of the car battery 25. FIG. 4 is an explanatory diagram of a data configuration of the EEPROM 17.

The ID change table stored in the EEPROM 17 indicates the correspondence between a pre-change unique ID and a post-change unique ID for a storage region storing control data of which the storage region has been changed to the alternative data storing region R2. The unique ID assigned to each partition in the alternative data storing region R2 is written in advance in each field of the post-change unique ID in the ID change table. The corresponding unique ID is successively written in the field of the pre-change unique ID, by an operation performed by the writing and reading control component 11b.

The previous value table functions as a backup area for control data having a high importance level. Specifically, the previous value table has a record for each control data to be backed up. Each control data has an importance level set to a reference value D1 or more. The record includes the unique ID and the value of the control data when the control data was backed up and saved (previous value).

The abnormality history previous value table functions as a backup area for data stored in the abnormality history storing region R3. The data stored in the abnormality history storing region R3 is written in the abnormality history previous value table by an operation performed by the writing and reading control component 11b at power-down.

Figure 5:
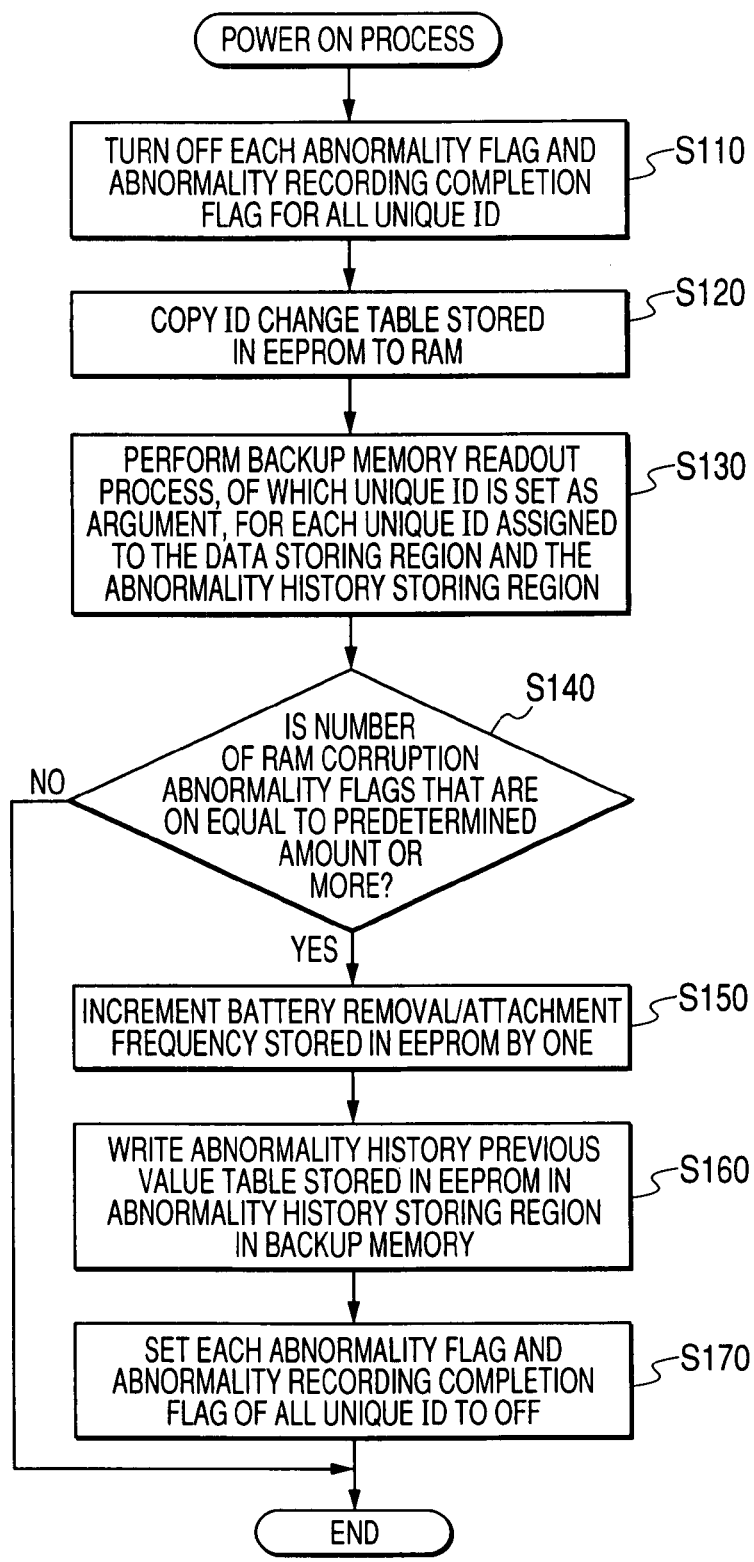
FIG. 5 is a flowchart of a power-ON process performed first by a writing and reading control component in the embodiment.

Next, processes performed by the writing and reading control component 11b will be described. FIG. 5 is a flowchart of a power-ON process performed first by the writing and reading control component 11b, after the ignition switch SW is turned ON.

When the power-ON process is started, the writing and reading control component 11b generates a RAM corruption abnormality flag, a writing abnormality flag, a power source instability abnormality flag, a memory cell abnormality flag, a RAM corruption abnormality recording completion flag, a writing abnormality recording completion flag, a power source instability abnormality recording completion flag, and a memory cell abnormality recording completion flag for each unique ID, for all unique ID assigned to each partition in the backup memory 13a. The writing and reading control component 11b sets each flag to OFF (S110).

The writing and reading control component 11b copies the ID change table stored in the EEPROM 17 in the RAM 13 (S120). Then, the writing and reading control component 11b performs a backup memory readout process (see FIG. 6) for each unique ID, for the unique ID assigned to each partition in the data storing region R1 and the abnormality history storing region R3 (S130). The unique ID is set in an argument of the backup memory readout process. Although the details will be described hereafter, in the backup memory readout process, data (control data or history data) corresponding to the unique ID set in the argument is read from the backup memory 13a, and whether a RAM corruption abnormality (illegal data) has occurred during readout examined. When the RAM corruption abnormality has occurred, an operation for turning ON the RAM corruption abnormality flag corresponding to the unique ID is performed When the backup memory readout process is performed for all relevant unique ID, the writing and reading control component 11b proceeds to S140 and judges whether the number of RAM corruption abnormality flags that are turned ON is equal to or more than a predetermined amount. When judged that the number of RAM corruption abnormality flags that are turned ON is less than the predetermined amount, (No at S140), the writing and reading control component 11b completes the power-ON process.

At the same time, when judged that the number of RAM corruption abnormality flags that are turned ON is equal to or more than the predetermined amount (Yes at S140), the writing and reading control component 11b judges that the car battery 25 has been removed or attached. The writing and reading control component 11b updates the data indicating the battery removal/attachment frequency stored in the EEPROM 17 to increase the battery removal/attachment frequency by one (S150).

Then, the writing and reading control component 11b copies the abnormality history previous value table stored in the EEPROM 17 to the abnormality history storing region R3 in the backup memory 13a (S160) and sets all flags of all unique ID to OFF (S170). Subsequently, the power-ON process is completed.

Figure 6:
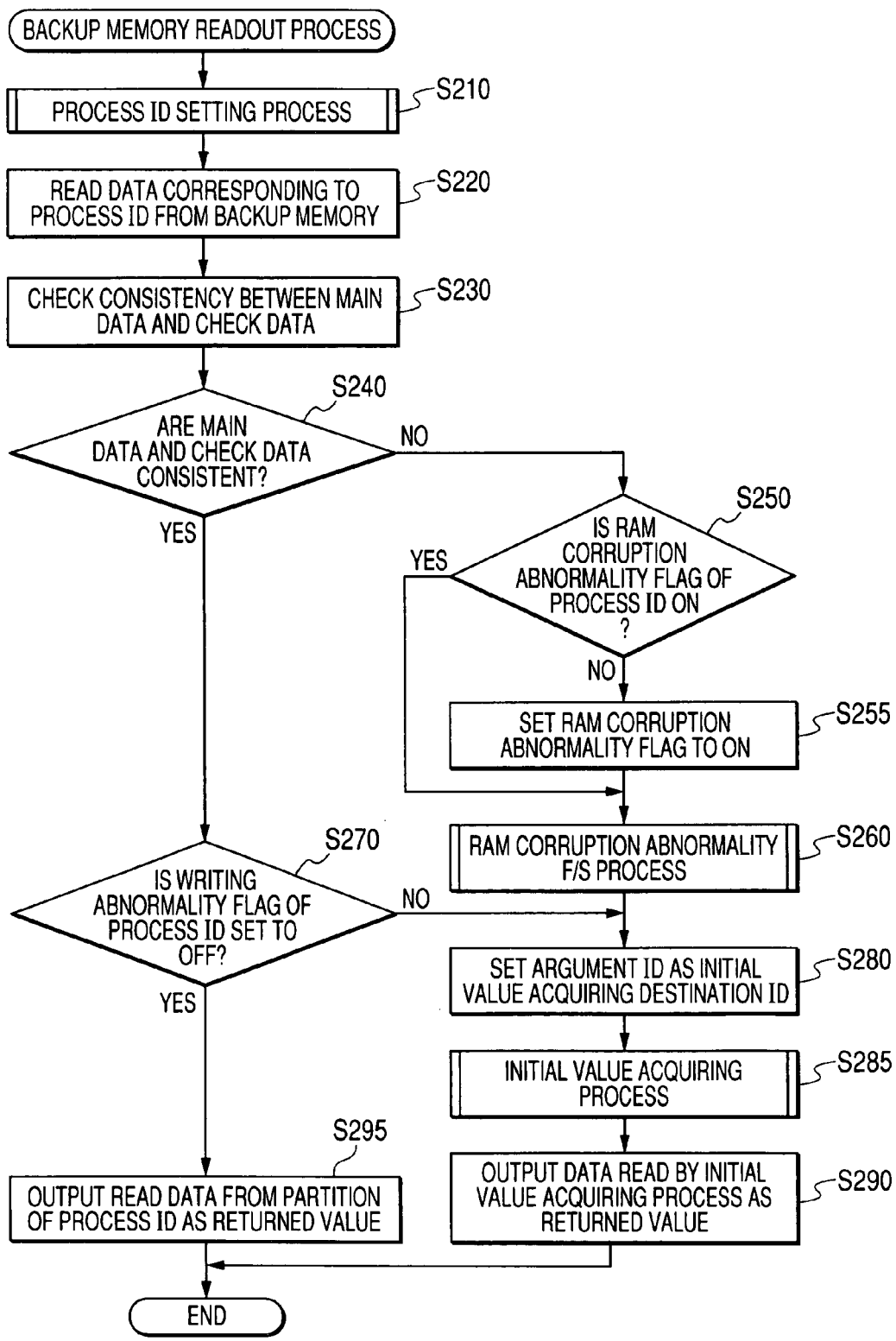
FIG. 6 is a flowchart of a backup memory readout process performed by the writing and reading control component.

Next, the backup memory readout process performed by the writing and reading control component 11b will be described. FIG. 6 is a flowchart of the backup memory readout process performed by the writing and reading control component 11b. The backup memory readout process is performed as required within the writing and reading control component 11b. In addition, the backup memory readout process is performed when a readout instruction to read the backup memory 13a is received from the learning control component 11a, after the power-ON process is performed.

Figure 7:
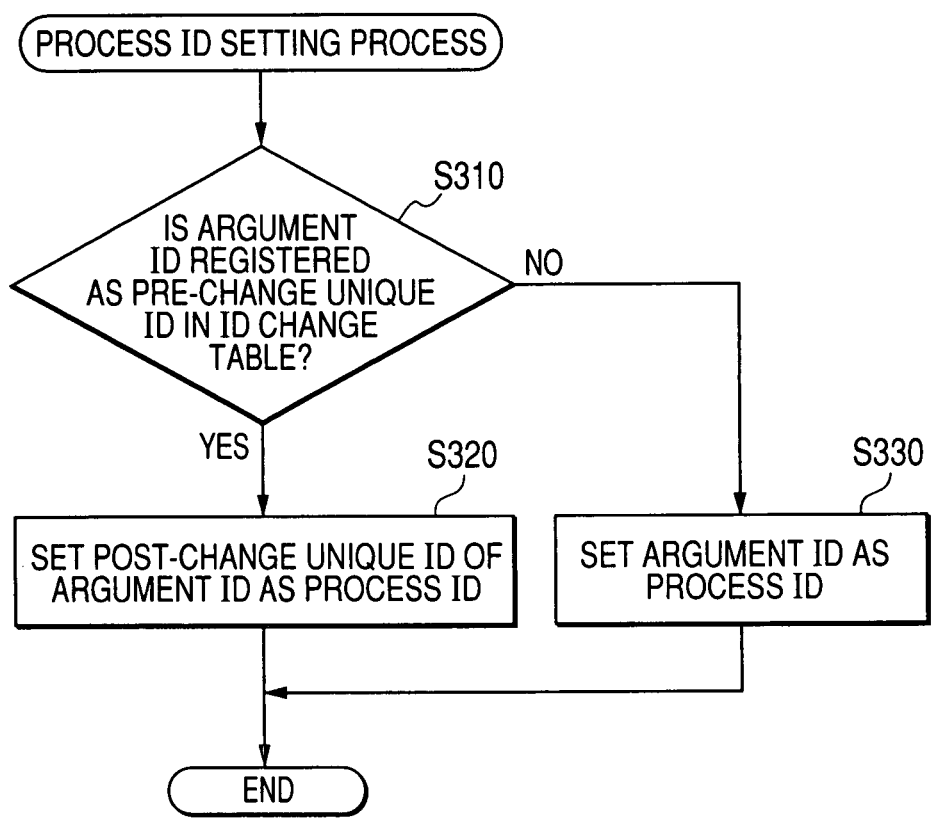
FIG. 7 is a flowchart of a process ID setting process performed by the writing and reading control component.

When the backup memory readout process is started, the writing and reading control component 11b first performs a process ID setting process shown in FIG. 7 (S210). The process ID setting process is performed using the unique ID set in the argument (hereinafter, referred to as "argument ID") when the backup memory readout process is performed. FIG. 7 is a flowchart of the process ID setting process performed by the writing and reading control component 11b.

When the process ID setting process is started, the writing and reading unit 11b judges whether the argument ID is the type of the unique ID registered as the pre-change unique ID in the ID change table in the RAM 13 (S310). When judged that the argument ID is the type of unique ID registered as the pre-change unique ID (Yes, at S310), the writing and reading control component 11b sets the post-change unique ID corresponding to the argument ID as a process ID (S320) and subsequently completes the process ID setting process. At the same time, when judged that the argument ID is not the type of unique ID registered as the pre-change unique ID in the ID change table (No, at S310), the writing and reading control component 11b sets the argument ID as the process ID (S330) and completes the process ID setting process.

When the process ID setting process at S210 is completed in this way, the writing and reading control component 11b reads data (control data or history data) stored in the partition in the backup memory 13a corresponding to the set process ID (S220). The writing and reading control component 11b examines whether the read data is not corrupted by confirming the consistency between the main data and the check data of the read data (S230). For example, when the check data indicates the total value of all bits in the main data, the writing and reading control component 11b calculates the total value of all bits in the main data paired with the check data, using checksum. Then, the writing and reading control component 11b confirms whether the calculated value matches the value indicated by the check data.

When the main data and the check data are consistent (the total value of all bits in the main data matches the value indicated by the check data) (Yes, at S240), the writing and reading control component 11b proceeds to S270. When the main data and the check data are inconsistent (the total value of all bits in the main data does not match the value indicated by the check data) (No, at S240), the writing and reading control component 11b judges that a RAM corruption abnormality has occurred and proceeds to Step S250.

After proceeding to S250, the writing and reading control component 11b judges whether the RAM corruption abnormality flag of the process ID is set to ON. When judged that the flag is not ON (No, at S250), the writing and reading control component 11b sets the RAM corruption abnormality flag to ON (S255). Then, the writing and reading control component 11b proceeds to Step S260. At the same time, when judged that the RAM corruption abnormality flag is ON (yes, at S250), the writing and reading control component 11b proceeds to S260 without performing the procedure at S255.

Figure 8:
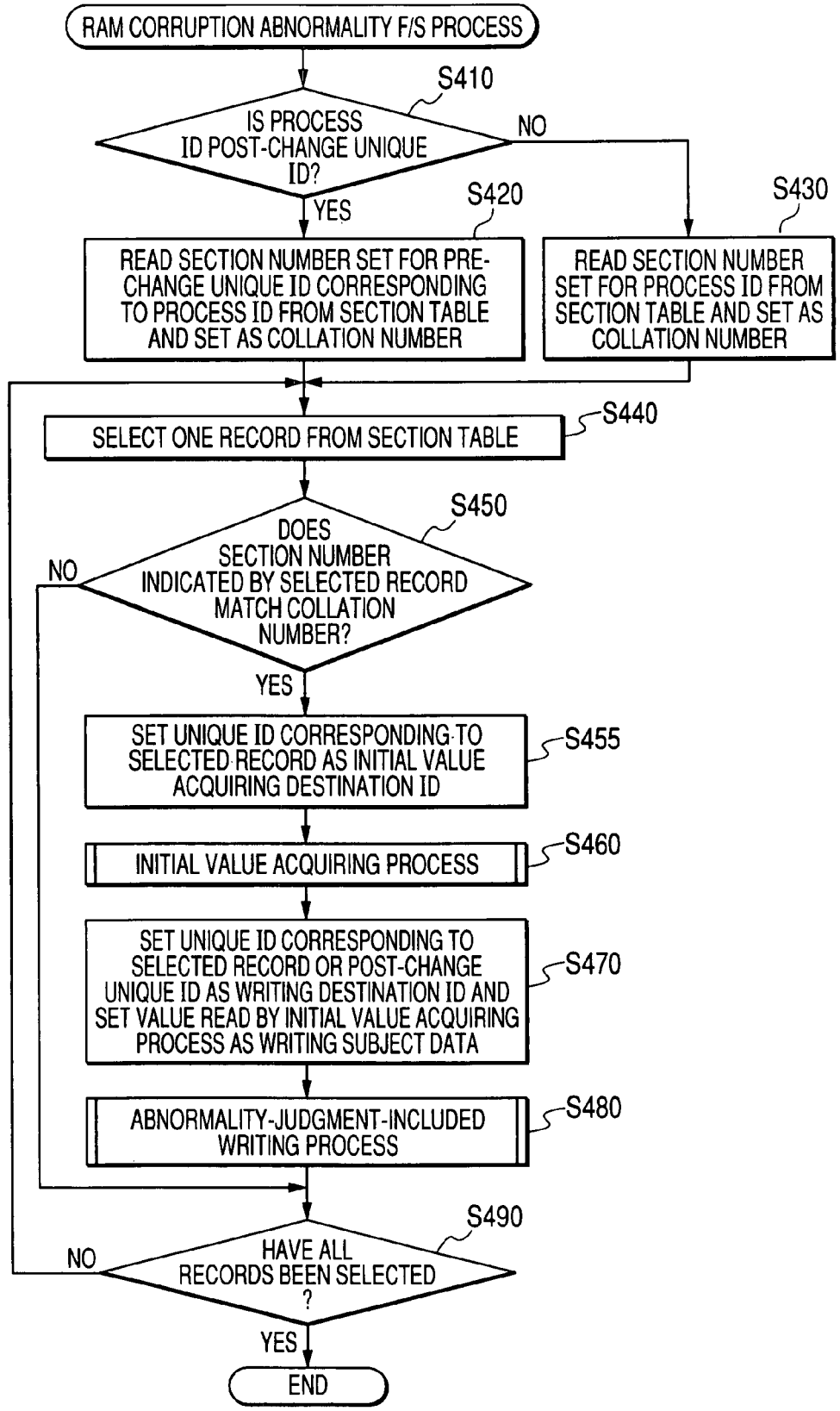
FIG. 8 is a flowchart of a RAM corruption abnormality F/S process performed by the writing and reading control component.

After proceeding to S260, the writing and reading control component 11b performs a RAM corruption abnormality failsafe (F/S) process. FIG. 8 is a flowchart of the RAM corruption abnormality F/S process performed by the writing and reading control component 11b.

When the RAM corruption abnormality F/S process is started, the writing and reading control component 11b first judges whether the process ID is the unique ID set via the procedure at S320 (post-change unique ID or, in other words, the unique ID assigned to the partition in the alternative data storing region R2) (S410). When judged that the process ID is the unique ID set via the procedure at S320 (Yes, at S410), the writing and reading control component 11b reads the section number set for the pre-change unique ID corresponding to the process ID from the section table stored in the ROM 15 and sets the read section number as a collation number (S420). Then, the writing and reading control component 11b proceeds to S440.

At the same time, when judged that the process ID is not the unique ID set via the procedure at S320 (No, at S410), the writing and reading control component 11b reads the section number set for the process ID from the section table stored in the ROM 15 and sets the read section number as the collation number (S430). Then, the writing and reading control component 11b proceeds to S440.

After proceeding to S440, the writing and reading control component 11b selects one unprocessed record of a procedure at S450 and after from within the section table and judges whether the section number indicated in the selected record matches the collation number (S450). When judged that the section number does not match the collation number (No, at S450), the writing and reading control component 11b proceeds to S490 without performing the procedures at Step S455 to S480.

Figure 9:
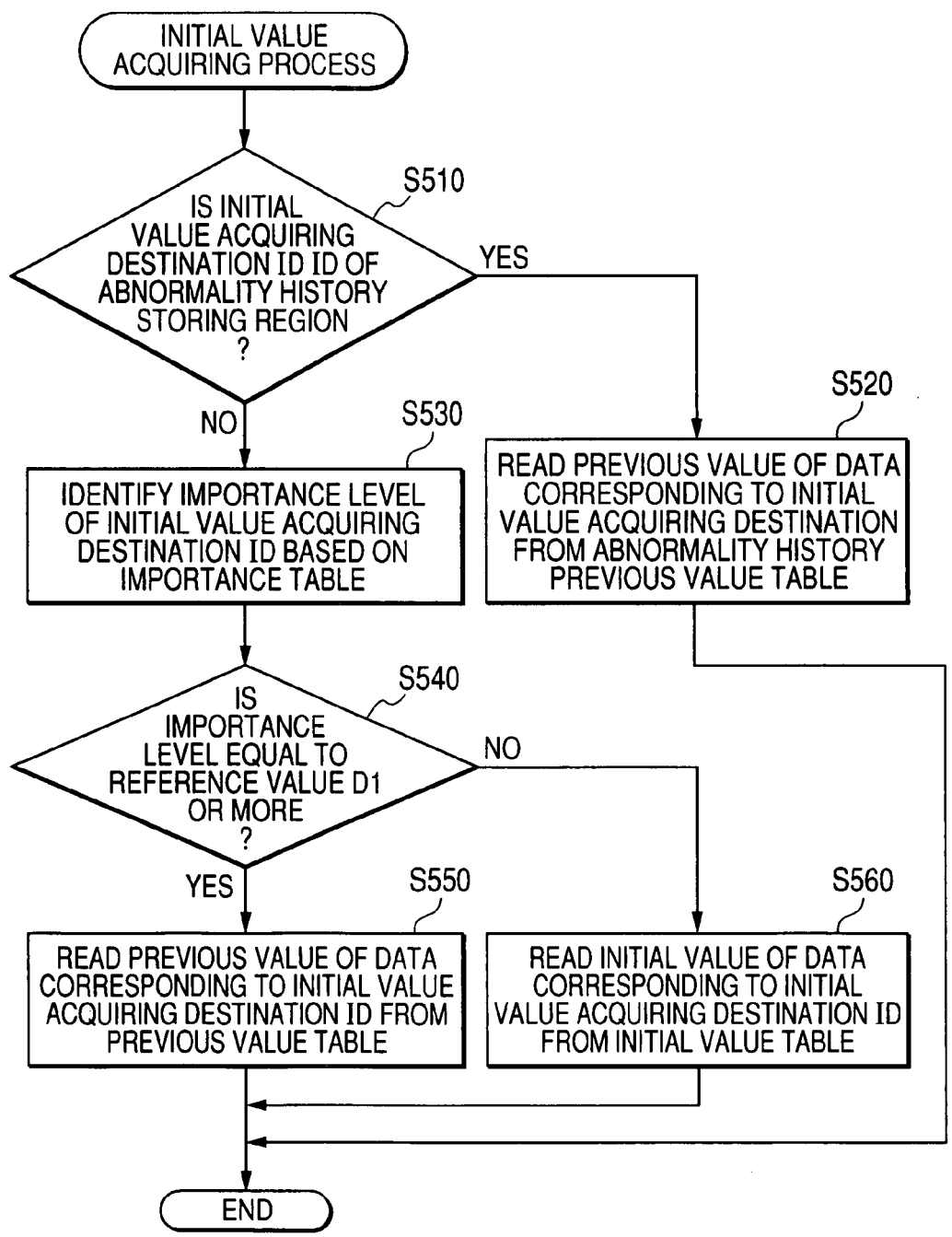
FIG. 9 is a flowchart of an initial value acquiring process performed by the writing and reading control component.

At the same time, when judged that the section number indicated in the selected record matches the collation number (Yes, at S450), the writing and reading control component 11b sets the unique ID corresponding to the section number in the selected record as an initial value acquiring destination ID (S455). The writing and reading control component 11b performs the initial value acquiring process shown in FIG. 9, using the initial value acquiring destination ID (S460). FIG. 9 is a flowchart of the initial value acquiring process performed by the writing and reading control component 11b.

When the initial value acquiring process is started, the writing and reading control component 11b judges whether the initial value acquiring destination ID is the unique ID assigned to the partition in the abnormality history storing region R3 at S510. When judged that the initial value acquiring destination ID is the unique ID assigned to the partition in the abnormality history storing region R3 (Yes, at S510), the writing and reading control component 11b reads the previous value of the history data corresponding to the initial value acquiring destination ID from the abnormality history previous value table (S520) and completes the initial value acquiring process.

At the same time, when judged that the initial value acquiring destination ID is not the unique ID assigned to the partition in the abnormality history storing region R3 but is the unique ID assigned to the partition in the data storing region RR or the alternative data storing region R2 (No, at S510), the writing and reading control component 11b identifies the importance level set to the initial value acquiring destination ID (S530) based on the importance table. Then, at S540, the writing and reading control component 11b judges whether the identified importance level is equal to or more than the reference value D1. The electronic control apparatus 1 according to the embodiment is configured to back up and save control data having an importance level equal to or more than the reference value D1 in the previous value table. The reference value D1 is used at S540.

When judged at S540 that the identified importance level is equal to or more than the reference value D1 (Yes, S540), the writing and reading control component 11b reads the previous value of the control data corresponding to the initial value acquiring destination ID from the previous value table (S550) and completes the initial value acquiring process. When judged at S540 that the identified importance level is less than the reference value D1 (No, at S540), the writing and reading control component 11b reads the initial value of the control data corresponding to the initial value acquiring destination ID from the initial value table (S560) and completes the initial value acquiring process.

After the initial value acquiring process at S460 is completed in this way, the writing and reading control component 11b proceeds to S470. At S470, the writing and reading control component 11b sets the unique ID corresponding to the section number in the selected record as a writing destination ID and the data read out by the initial value acquiring process as writing subject data. However, when the unique ID corresponding to the section number in the selected record is registered as the pre-change unique ID in the ID change table in the RAM 13, the writing and reading control component 11b sets the post-change unique ID corresponding to the unique ID as the writing destination ID at S470.

Figure 10:
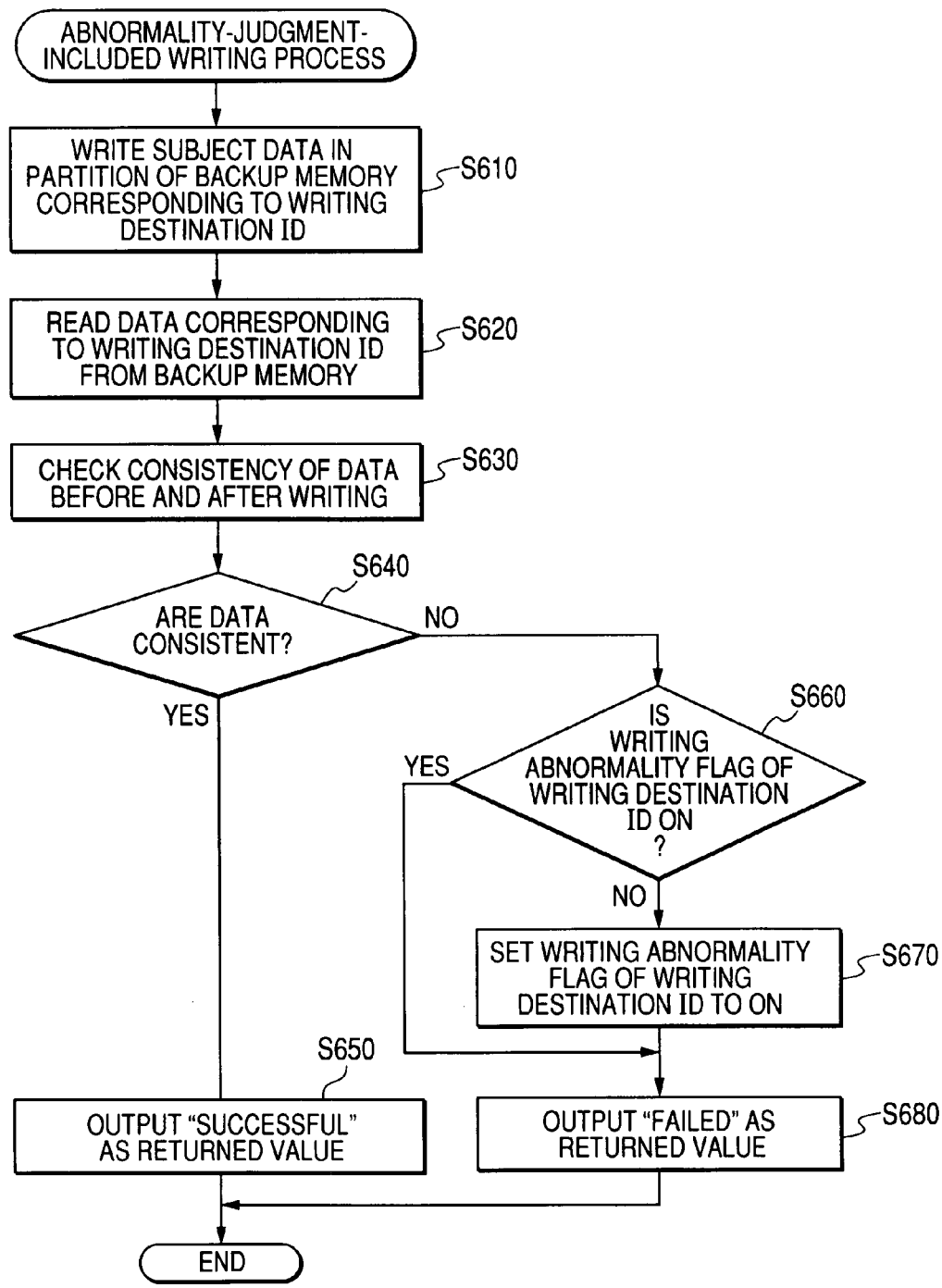
FIG. 10 is a flowchart of an abnormality-judgment-included writing process performed by the writing and reading control component.

When the procedure at Step S470 is completed in this way, the writing and reading control component 11b performs an abnormality-judgment-included writing process shown in FIG. 10, using the writing destination ID and the writing subject ID (S480). FIG. 10 is a flowchart of an abnormality-judgment-included writing process performed by the writing and reading control component 11b.

When the abnormality-judgment-included writing process is started, the writing and reading control component 11b writes the writing subject data in the partition within the backup memory 13a corresponding to the writing destination ID (S610) and proceeds to S620. At S620, the writing and reading control component 11b reads the data written in the partition corresponding to the writing destination ID and checks the consistency of the read data and the writing subject data (S630). In other words, the writing and reading control component 11b judges whether the read data and the writing subject data match. When the read data and the writing subject data are consistent (the read data and the writing subject data match) (Yes, at S640), the writing and reading control component 11b outputs a value indicating that the writing has been "successful" as a returned value (S650) and completes the abnormality-judgment-included writing process.

At the same time, when the read data and the writing subject data are not consistent (the read data and the writing subject data do not match) (No, at S640), the writing and reading control component 11b judges that the writing abnormality has occurred and proceeds to S660. At S660, the writing and reading control component 11b judges whether the writing abnormality flag of the writing destination ID is set to ON. When judged that the writing abnormality flag of the writing destination ID is not set to ON (No, at S660), the writing and reading control component 11b sets the writing abnormality flag of the writing destination ID to ON (S670) and proceeds to S680. At S680, the writing and reading control component 11b outputs a value indicating that the writing has "failed" as the returned value and completes the abnormality-judgment-included writing process.

When judged that the writing abnormality flag of the writing destination ID is set to ON (Yes, S660), the writing and reading control component 11b proceeds to S680 without performing the procedure at S670. The writing and reading control component 11b outputs the value indicating that the writing has "failed" as the returned value and completes the abnormality-judgment-included writing process.

When the abnormality-judgment-included writing process at S480 is completed in this way, the writing and reading control component 11b proceeds to S490 and judges whether the procedures at S450 and subsequent steps have been performed for all records within the section table. When judged that the procedures at S450 and subsequent steps have not been performed for all records (No, at S490), the writing and reading control component 11b proceeds to S440. At the same time, when judged that the procedures at S450 and subsequent steps have been performed for all records (Yes, at S490), the writing and reading control component 11b completes the RAM corruption abnormality F/F process.

When the RAM corruption abnormality F/F process at S260 is completed in this way, the writing and reading control component 11b proceeds to S280.

After proceeding to S280, the writing and reading control component 11b sets the unique ID (argument ID) set in the argument when performing the backup memory readout process as the initial value acquiring destination ID. Then, the writing and reading control component 11b performs the initial value acquiring process shown in FIG. 9, using the initial value acquiring destination ID (S285). Next, the writing and reading control component 11b outputs the data read by the initial value acquiring process at S285 as the returned value to an execution instruction source giving the instruction to perform the backup memory readout process (S290). Then, the writing and reading control component 11b completes the backup memory readout process.

After proceeding to S270 in the backup memory readout process, the writing and reading control component 11b judges whether the writing abnormality flag of the process ID is set to OFF. When judged that the writing abnormality flag of the process ID is set to OFF (Yes, at S270), the writing and reading control component 11b outputs the data corresponding to the process ID read at S220 as the returned value (S295) and completes the backup memory readout process.

When judged at S270 that the writing abnormality flag of the process ID is set to ON (No, at S270), the writing and reading control component 11*b* performs the procedures at S280 to S290 and completes the backup memory readout process.

Figure 11:
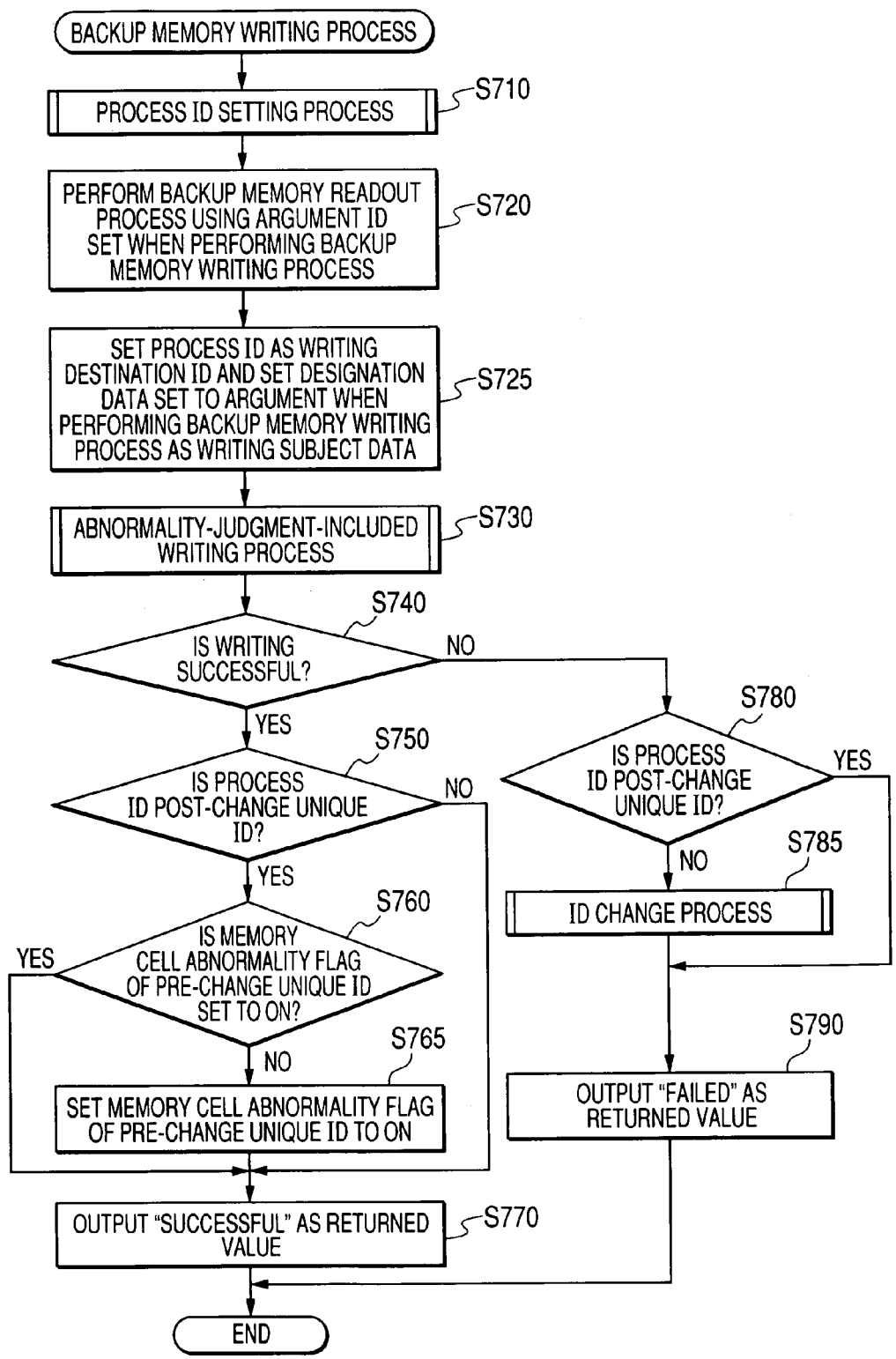
FIG. 11 is a flowchart of a backup memory writing process performed by the writing and reading control component.

Next, a backup memory writing process performed by the writing and reading control component 11*b* will be described. FIG. 11 is a flowchart of the backup memory writing process performed by the writing and reading control component 11*b*. The backup memory writing process is performed as required within the writing and reading control component 11*b*. In addition, the backup memory writing process is performed when a writing instruction to write in the backup memory 13*a* is received from the learning control component 11*a*, after the power-ON process is performed.

When the backup writing process is started, the writing and reading control component 11*b* first performs the process ID setting process shown in FIG. 7, using the unique ID set in the argument when performing the backup memory writing process (S710). In addition, the writing and reading control component 11*b* sets the argument to the same unique ID as the unique ID set as the argument when performing the backup memory writing process and performs the backup memory readout process (see FIG. 6) (S720). The backup memory readout process is performed at S720 for the purpose of detecting illegal data in the partition corresponding to the process ID.

Subsequently, the writing and reading control component 11*b* proceeds to S725 and sets the process ID set at S710 as the writing destination ID and sets designation data set in the argument when performing the backup memory writing process as the writing subject data. Then, the writing and reading control component 11*b* performs the abnormality-judgment-included writing process shown in FIG. 10 using the writing destination ID and the writing subject data (S730).

When the abnormality-judgment-included writing process at S730 is completed, the writing and reading control component 11*b* judges whether the writing subject data has been successfully written to the backup memory 13, based on the returned value (S740). When judged that the writing has been successful (Yes, at S740), the writing and reading control component 11*b* judges whether the process ID is the unique ID (post-change unique ID) set via the process ID setting process at S710 (S750).

When judged that the process ID is the unique ID set via the procedure at S320 (Yes, at S750), the writing and reading control component 11*b* proceeds to S760. When judged that the process ID is the unique ID set via the procedure at S330 (No, at S750), the writing and reading control component 11*b* proceeds to S770.

After proceeding to S760, the writing and reading control component 11*b* judges whether the memory cell abnormality flag of the pre-change unique ID corresponding to the process ID is set to ON. When judged that the memory cell abnormality flag of the pre-change unique ID is set to OFF (No, at S760), the writing and reading control component 11*b* sets the memory cell abnormality flag of the pre-change unique ID to ON (S765) and proceeds to S770. At the same time, when judged that the memory cell abnormality flag of the pre-change unique ID corresponding to the process ID is set to ON (Yes, at S760), the writing and reading control component 11*b* proceeds to S770 without performing the procedure at S765.

After proceeding to S770, the writing and reading control component 11*b* outputs a value indicating that the writing has been "successful" as a returned value to an execution instruction source giving the instruction to perform the backup memory writing process and completes the backup memory writing process.

When judged that the writing of the writing subject data to the backup memory 13*a* has failed, based on the returned value outputted by the abnormality-judgment-included writing process at S730 (No, at S740), the writing and reading control component 11*b* proceeds to S780. At S780, the writing and reading control component 11*b* judges whether the process ID is the unique ID (post-change unique ID) set via the process at S320 in the process ID setting process at S710.

When judged that the process ID is the unique ID set via the procedure at S320 (Yes, at S780), the writing and reading control component 11*b* proceeds to S790 without performing the procedure at S785. When judged that the process ID is the unique ID set via the procedure at S330 (No, at S780), the writing and reading control component 11*b* proceeds to S785 and performs an ID change process shown in FIG. 12. When the ID change process is completed, the writing and reading control component 11*b* proceeds to S790.

After proceeding to S790, the writing and reading control component 11*b* outputs a value indicating that the writing has "failed" as the returned value to the execution instruction source giving the instruction to perform the backup memory writing process and completes the backup memory writing process. The execution instruction source (the learning control component 11*a* and the like) that obtains "failed" as the returned value of the backup memory writing process takes measures, such as attempting to perform the same backup memory writing process a predetermined number of times until the writing is successful. When the process at S790 is completed, the writing and reading control component 11*b* completes the backup memory writing process.

Figure 12:
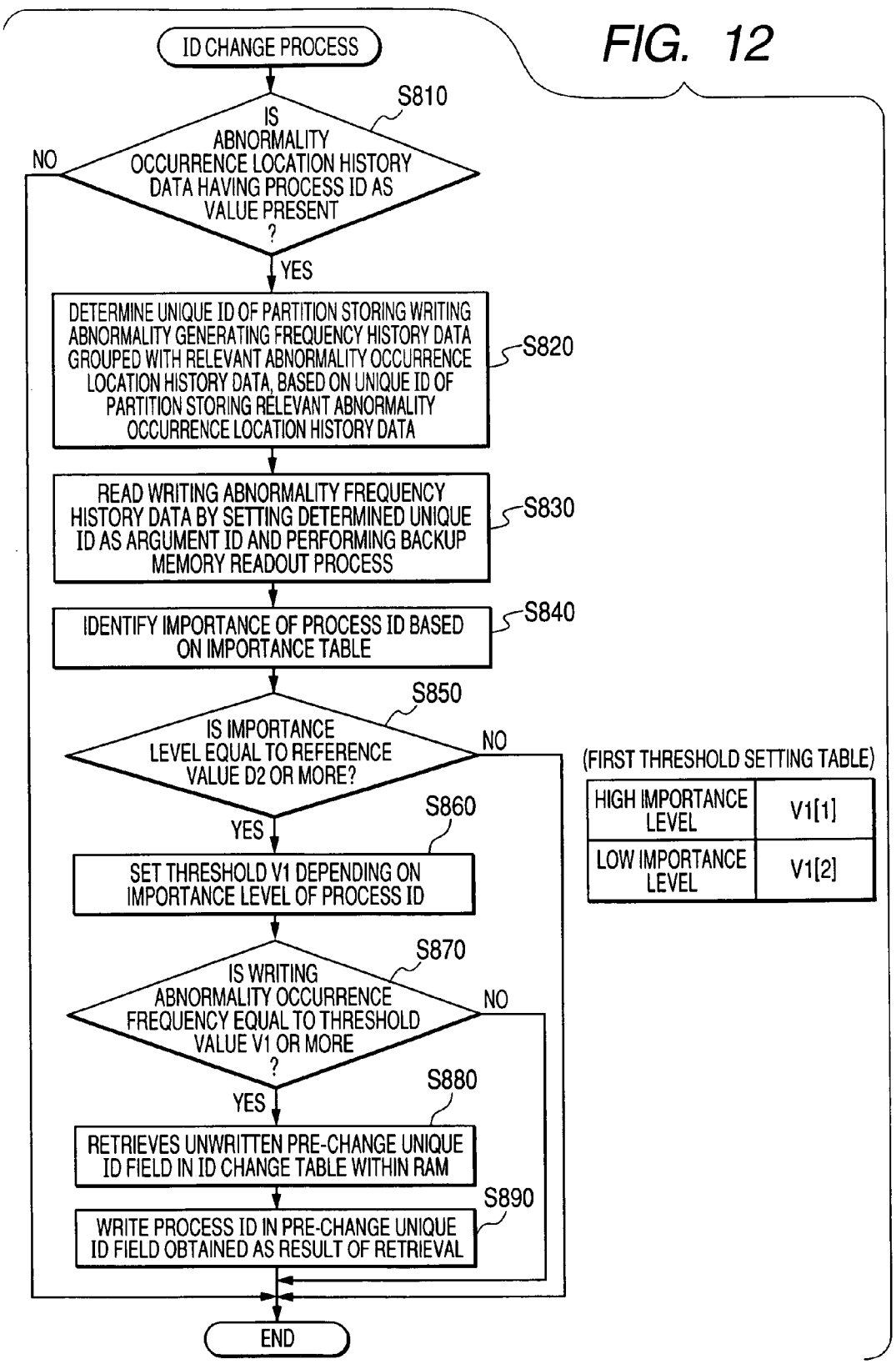
FIG. 12 is a flowchart of an ID change process performed by the writing and reading control component.

Next, the ID change process performed at S785 will be described. FIG. 12 is a flowchart of the ID change process performed at S785 by the writing and reading control component 11*b*.

When the ID change process is started, the writing and reading control component 11*b* judges whether the abnormality occurrence location history data having the process ID set at S710 as a value is recorded in the abnormality history storing region R3 (S810). When judged that the abnormality occurrence location history data is not recorded in the abnormality history storing region R3 (No, at S810), the writing and reading control component 11*b* completes the ID change process.

At the same time, when judged that the abnormality occurrence location history data having the process ID set at S710 as the value is recorded in the abnormality history storing region R3 (Yes, at S810), the writing and reading control component 11*b* determines the unique ID of the partition storing the writing abnormality occurrence frequency history data grouped with the abnormality occurrence location history data having the process ID as the value, based on the unique ID of the partition storing the abnormality occurrence location history data (S820). Then, the writing and reading control component 11*b* reads the writing abnormality occurrence frequency history data from the backup memory 13*a* by setting the determined unique ID as the argument ID and performing the backup memory readout process (S830).

Next, the writing and reading control component 11*b* identifies the importance level set to the process ID based on the importance table (S840) and judges whether the importance level, set to the process ID is equal to or more than a predetermined reference value D2 (S850). The reference value D2 is used to distinguish data permitted to use the alternative data storing region R2.

When judged that the importance level is equal to or more than the reference value D2 (Yes, at S850), the writing and reading control component 11*b* proceeds to S860. When judged that the importance level set to the process ID is less than the reference value D2 (No, at S850), the writing and reading control component 10b completes the ID change process.

After proceeding to S860, the writing and reading control component 11b sets a threshold V1 that differs depending on the importance level set for the process ID, based on a first threshold setting table stored in the ROM 15. As shown in FIG. 12, a value V1[1] and a value V1[2] are written in the first threshold setting table. The value V1[1] is to be set as the threshold V1 when the importance level is equal to or more than a predetermined reference value D3 (D3>D2). The value V1[2] is to be set as the threshold V1 when the importance level is less than the reference value D3.

When the procedure at S860 is completed, the writing and reading control component 11b judges whether the occurrence frequency of the writing abnormality indicated by the writing abnormality occurrence frequency history data read at S830 is equal to or more than the threshold V1 (S870). When judged that the occurrence frequency of the writing abnormality is equal to or more than the threshold V1 (Yes, at S870), the writing and reading control component 11b retrieves an empty (unused) pre-change unique ID field from the ID change table in the RAM 13 (S880). The writing and reading control component lib assigns the post-change unique ID to the process ID by writing the process ID in the unused field found as a result of the retrieval (S890). In other words, the writing and reading control component 11b assigns a partition within the alternative data storing region R2 as a new storage region for data using the partition of the process ID as the storage location. Then, the writing and reading control component 11b completes the ID change process.

At the same time, when judged that occurrence frequency of the writing abnormality indicated by the writing abnormality occurrence frequency history data read at S830 is less than the threshold V1 (No, at S870), the writing and reading control component 11b completes the ID change process without performing the procedures at S880 to S890.

According to the embodiment, the judgment at S850 is always No when the importance level of each partition in the abnormality history storing region R3 is set to the lowest level and the process ID is the unique ID of these partitions.

Figure 13:
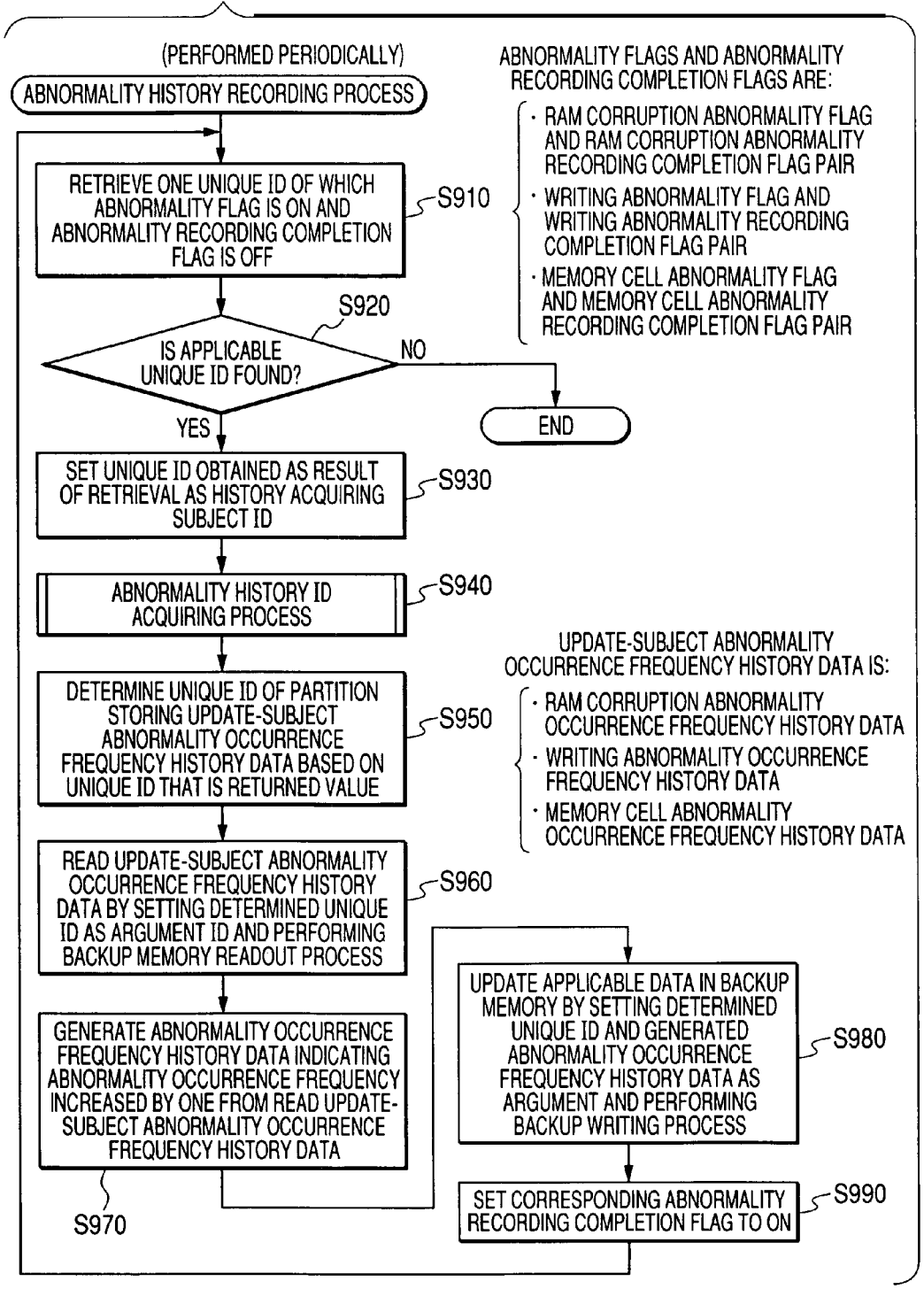
FIG. 13 is a flowchart of an abnormality history recording process periodically performed by the writing and reading control component.

Next, a process periodically performed by the writing and reading control component 11b during a period in which the vehicle is controlled (vehicle operation period), based on the count value of the timer 19, will be described. FIG. 13 is a flowchart of an abnormality history recording process periodically performed by the writing and reading control component 11b to record abnormality histories. According to the embodiment, a total of three abnormality history recording processes are provided: an abnormality history recording process for recording the occurrence frequency of RAM corruption abnormality, an abnormality history recording process for recording the occurrence frequency of writing abnormality, and an abnormality history recording process for recording the occurrence frequency of memory cell abnormality. The writing and reading control component 11b periodically performs each abnormality history recording process according to the steps shown in FIG. 13.

Hereafter, the respective abnormality history recording processes will be described collectively. The term "abnormality flag" in the description refers to the RAM corruption abnormality flag when the abnormality history recording process for recording the occurrence frequency of RAM corruption abnormality is performed. The term "abnormality flag" refers to the writing abnormality flag when the abnormality history recording process for recording the occurrence frequency of writing abnormality is performed. The term "abnormality flag" refers to the memory cell abnormality flag when the abnormality history recording process for recording the occurrence frequency of memory cell abnormality is performed.

The term "abnormality recording completion flag" refers to the RAM corruption abnormality recording completion flag when the abnormality history recording process for recording the occurrence frequency of RAM corruption abnormality is performed. The term "abnormality recording completion flag" refers to the writing abnormality recording completion flag when the abnormality history recording process for recording the occurrence frequency of writing abnormality is performed. The term "abnormality recording completion flag" refers to the memory cell abnormality recording completion flag when the abnormality history recording process for recording the occurrence frequency of memory cell abnormality is performed.

The term "update-subject abnormality occurrence frequency history data" refers to the RAM corruption abnormality occurrence frequency history data when the abnormality history recording process for recording the occurrence frequency of RAM corruption abnormality is performed. The term "update-subject abnormality occurrence frequency history data" refers to the writing abnormality occurrence frequency history data when the abnormality history recording process for recording the occurrence frequency of writing abnormality is performed. The term "update-subject abnormality occurrence frequency history data" refers to the memory cell abnormality occurrence frequency history data when the abnormality history recording process for recording the occurrence frequency of memory cell abnormality is performed.

When the abnormality history recording process shown in FIG. 13 is started, the writing and reading control component 11b retrieves one unique ID of which the abnormality flag is set to ON and the abnormality recording completion flag is set to OFF, from among the unique ID assigned to each partition in the backup memory 13a (S910). When an applicable unique ID is not found as a result of the retrieval (No, at S910), the writing and reading control component 11b completes the abnormality history recording process. When an applicable unique ID is found (Yes, at S920), the writing and reading control component 11b proceeds to S930.

Figure 14:
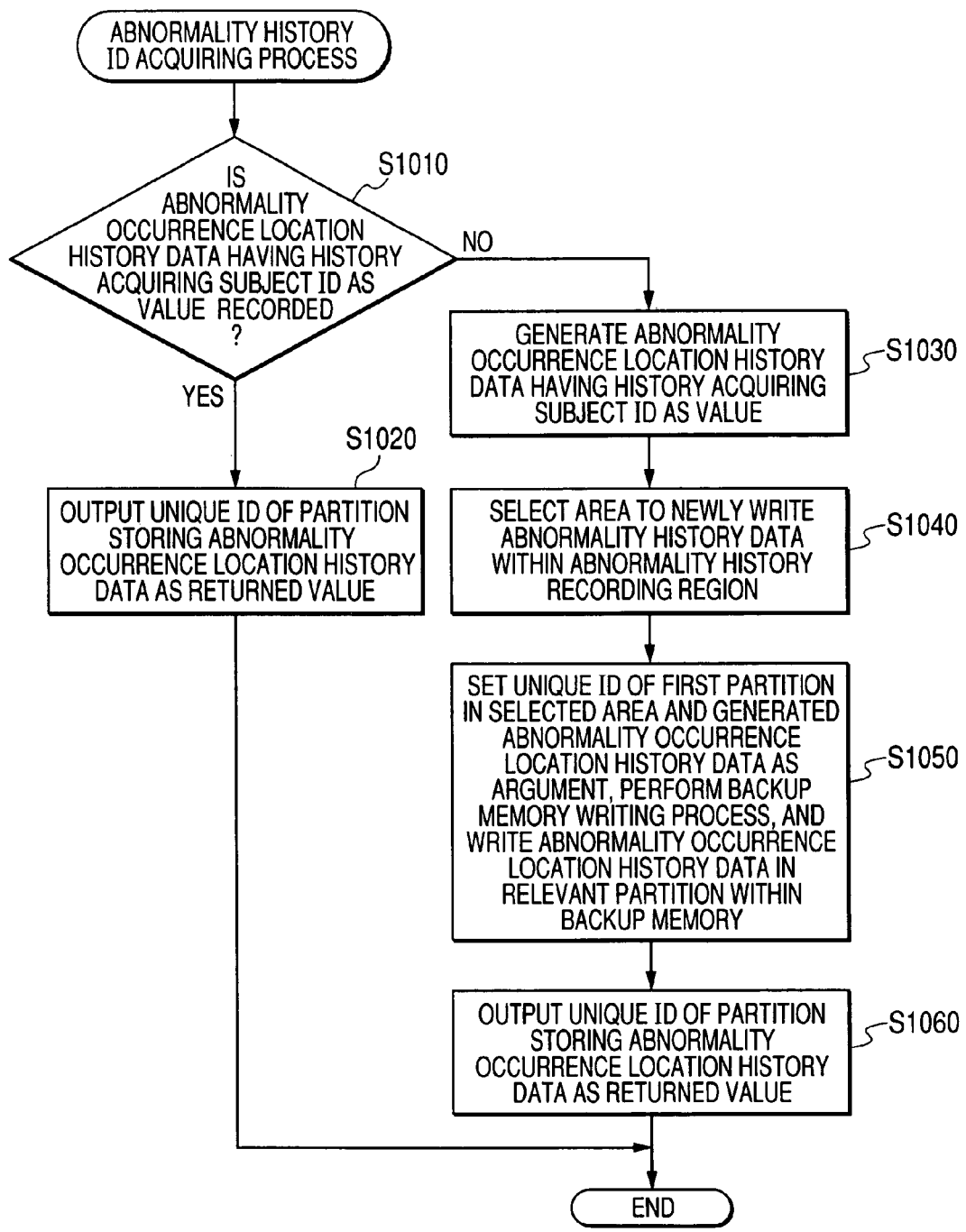
FIG. 14 is a flowchart of an abnormality history ID acquiring process performed by the writing and reading control component.

After proceeding to S930, the writing and reading control component 11b sets the unique ID found as a result of the retrieval as a history acquiring subject ID and performs an abnormality history ID acquiring process shown in FIG. 14 using the history acquiring subject ID. FIG. 14 is a flowchart of the abnormality history ID acquiring process performed by the writing and reading control component 11b.

When the abnormality history ID acquiring process is started, the writing and reading control component 11b judges whether the abnormality occurrence location history data having the set history acquiring subject ID as the value is recorded in the abnormality history storing region R3 (S1010). When judged that the abnormality occurrence location history data having the history acquiring subject ID as the value is recorded in the abnormality history storing region R3 (Yes, at S1010), the writing and reading control component 11b proceeds to S1020. At S1020, the writing and reading control component 11b outputs the unique ID of the partition storing the abnormality occurrence location history data as the returned value and completes the abnormality history ID acquiring process.

At the same time, when judged that the abnormality occurrence location history data having the history acquiring subject ID as the value is not recorded in the abnormality history storing region R3 (No, at S1010), the writing and reading control component 11b generates the abnormality occurrence location history data having the history acquiring subject ID as the value (main data) (S1030). Then, the writing and reading control component 11b selects an area from among the unused areas within the abnormality history storing region R3 to newly store the abnormality history data (S1040). Next, the writing and reading control component 11b sets the unique ID of the first partition of the selected area as the argument ID, sets the abnormality occurrence location history data generated at S1030 in the argument as the designation data, performs the backup memory writing process shown in FIG. 11, and writes the abnormality occurrence location history data generated at S1030 in the first partition of the selected region (S1050).

Then, the writing and reading control component 11b outputs the unique ID of the partition in which the abnormality occurrence location history data is written as the returned value (S1060) and completes the abnormality history ID acquiring process.

When the abnormality history ID acquiring process at S940 is completed in this way, the writing and reading control component 11b determines the unique ID of the partition storing the update-subject abnormality occurrence frequency history data based on the unique ID that is the returned value (S950). The determined unique ID is grouped with the unique ID that is the returned value. The writing and reading control component 11b reads the update-subject abnormality occurrence frequency history data from the backup memory 13a by setting the determined unique ID as the argument and performing the backup memory readout process (S960).

Then, based on the update-subject abnormality occurrence frequency history data obtained as the returned value in the backup memory readout process, the writing and reading control component 11b newly generates abnormality occurrence frequency history data indicating an abnormality occurrence frequency that is increased by one from the abnormality occurrence frequency of the returned update-subject abnormality occurrence frequency history data (S970). The unused area in the abnormality history storing region R3 is initialized by data indicating the value zero. In other words, when a new area is selected in the abnormality history ID acquiring process at S940, the abnormality occurrence frequency history data read at S960 indicates the value zero as the abnormality occurrence frequency.

Then, the writing and reading control component 11b sets the unique ID determined at S950 as the argument ID, sets the abnormality occurrence frequency history data generated at S970 in the argument as the designation data, performs the backup memory writing process shown in FIG. 11, and writes the abnormality occurrence frequency history data generated at S970 in the partition corresponding to the determined unique ID (S980). As a result, the writing and reading control component 11b updates the update-subject abnormality occurrence frequency history data within the backup memory 13a so that the abnormality occurrence frequency is increased by one.

After completing the procedure at S980, the writing and reading control component 11b proceeds to S990 and sets the abnormality recording completion flag of the unique ID (history acquiring subject ID) found as a result of the retrieval at S910 to ON. Then, the writing and reading control component 11b returns to S910 and once again retrieves a unique ID of which the abnormality flag is set to ON and the abnormality recording completion flag is set to OFF. When the unique ID of which the abnormality flag is set to ON and the abnormality recording completion flag is set to OFF is not found, the writing and reading control component 11b completes the abnormality history recording process.

Figure 15:
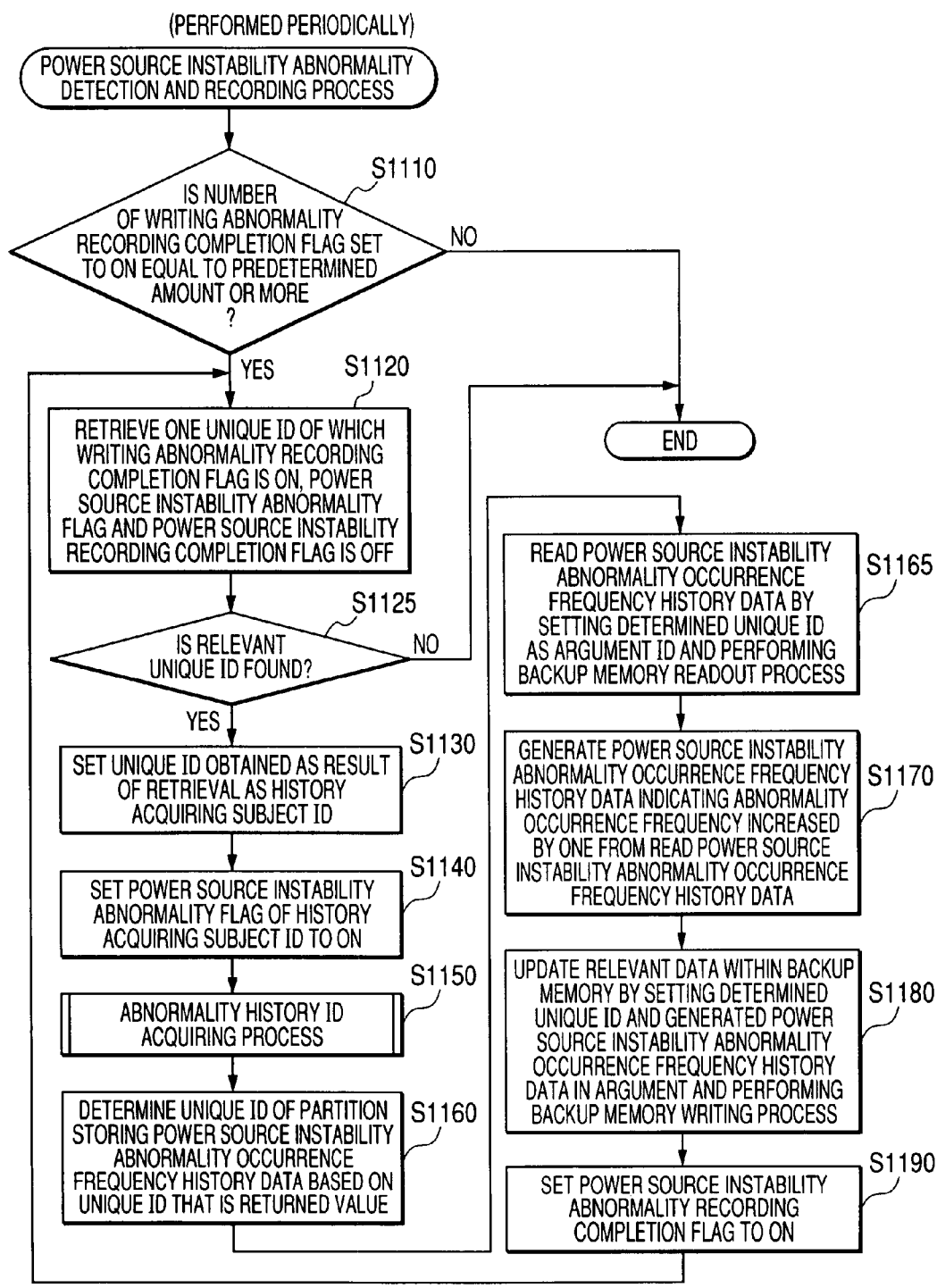
FIG. 15 is a flowchart of a power source instability detection recording process performed by the writing and reading control component.

Next, a power source instability detection and recording process periodically performed by the writing and reading control component 11b to detect the power source instability abnormality and record the abnormality histories of the power source instability abnormality will be described. FIG. 15 is a flowchart of the power source instability detection and recording process performed by the writing and reading control component 11b.

When the power source instability detection and recording process is started, the writing and reading control component 11b detects the power source instability abnormality by judging whether the number of writing abnormality recording completion flags currently set to ON is equal to or more than a predetermined amount (S1110).

When judged that the number of writing abnormality recording completion flags currently set to ON is less than the predetermined amount (No, at S1110), the writing and reading control component 11b judges that the power source instability abnormality has not occurred and completes the power source instability abnormality detection and recording process without performing the procedures at S1120 to S1190.

At the same time, when judged that the number of writing abnormality recording completion flags currently set to ON is equal to or more than the predetermined amount (Yes, at S1110), the writing and reading control component 11b judges that the power source instability abnormality has occurred and proceeds to S1120.

After proceeding to S1120, the writing and reading control component 11b retrieves one unique ID of which the writing abnormality recording completion flag is set to ON and the power source instability abnormality flag and the power source instability abnormality recording completion flag are set to OFF, from among the unique ID assigned to each partition in the backup memory 13a. When the relevant unique ID is not found as a result of the retrieval (No, at S1125), the writing and reading control component 11b completes the power source instability abnormality detection and recording process. When the relevant unique ID is found (Yes, at S1125), the writing and reading control component 11b proceeds to S1130.

After proceeding to S1130, the writing and reading control component 11b sets the unique ID found as a result of the retrieval as the history acquiring subject ID and sets the power source instability abnormality flag of the unique ID (history acquiring subject flag) to ON (S1140). The writing and reading control component 11b performs the abnormality history ID acquiring process shown in FIG. 14 using the history acquiring subject ID set at S1130 (S1150).

When the abnormality history ID acquiring process at S1150 is completed, the writing and reading control component 11b determines the unique ID of the partition storing the corresponding power source instability abnormality occurrence frequency history data, based on the unique ID that is the returned value (S1160). The writing and reading control component 11b reads the power source instability abnormality occurrence frequency history data from the backup memory 13a by setting the determined unique ID in the argument and performing the backup memory readout process. Then, based on the power source instability abnormality occurrence frequency history data obtained as the returned value in the backup memory readout process, the writing and reading control component 11b newly generates the power source instability abnormality occurrence frequency history data indicating an abnormality occurrence frequency that is increased by one from the abnormality occurrence frequency of the returned power source instability abnormality occurrence frequency history data (S1170).

Next, to write the newly generated power source instability abnormality occurrence frequency history data in the backup memory 13a, the writing and reading control component 11b sets the unique ID determined at S1160 as the argument ID, sets the power source instability abnormality occurrence frequency history data generated at S1170 in the argument as the designation data, performs the backup memory writing process shown in FIG. 11, and writes the power source instability abnormality occurrence frequency history data generated at S1170 in the partition corresponding to the determined unique ID (S1180). As a result, at S1180, the writing and reading control component 11b updates the corresponding power source instability abnormality occurrence frequency history data within the backup memory 13a so that the abnormality occurrence frequency is increased by one.

After the process at S1180 is completed, the writing and reading control component 11b proceeds to S1190 and sets the power source instability abnormality recording completion flag of the unique ID (history acquiring subject ID) found as a result of the retrieval at S1120 to ON. Then, the writing and reading control component 11b returns to S1120 and once again retrieves a retrieves the unique ID of which the writing abnormality recording completion flag is set to ON and the power source instability abnormality flag and the power source instability abnormality recording completion flag are set to OFF. When the relevant unique ID is not found, the writing and reading control component 11b completes the power source instability detection and recording process.

Figure 16:
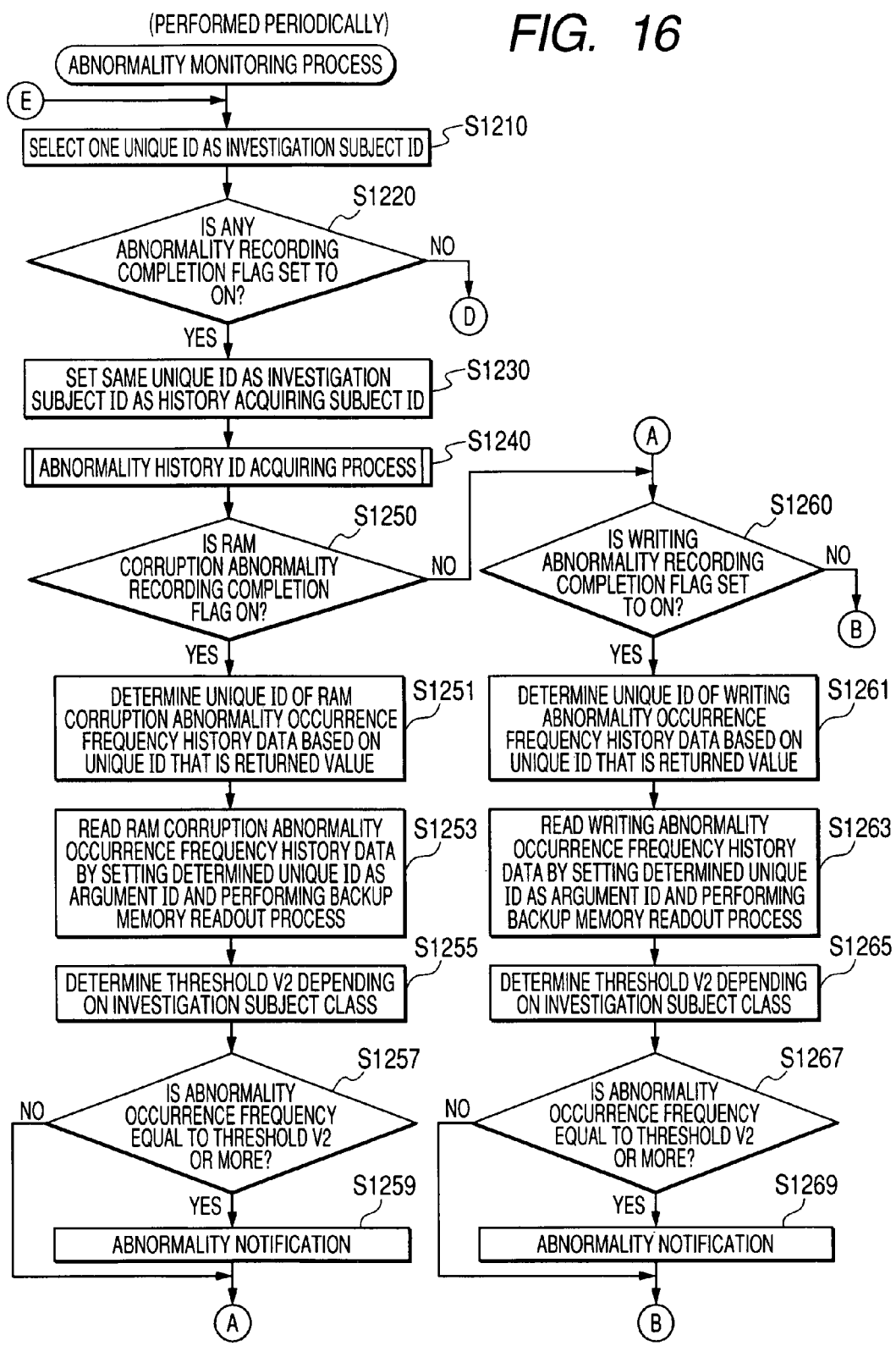
FIG. 16 is a flowchart of an abnormality monitoring process performed by the writing and reading control component.
Figure 17:
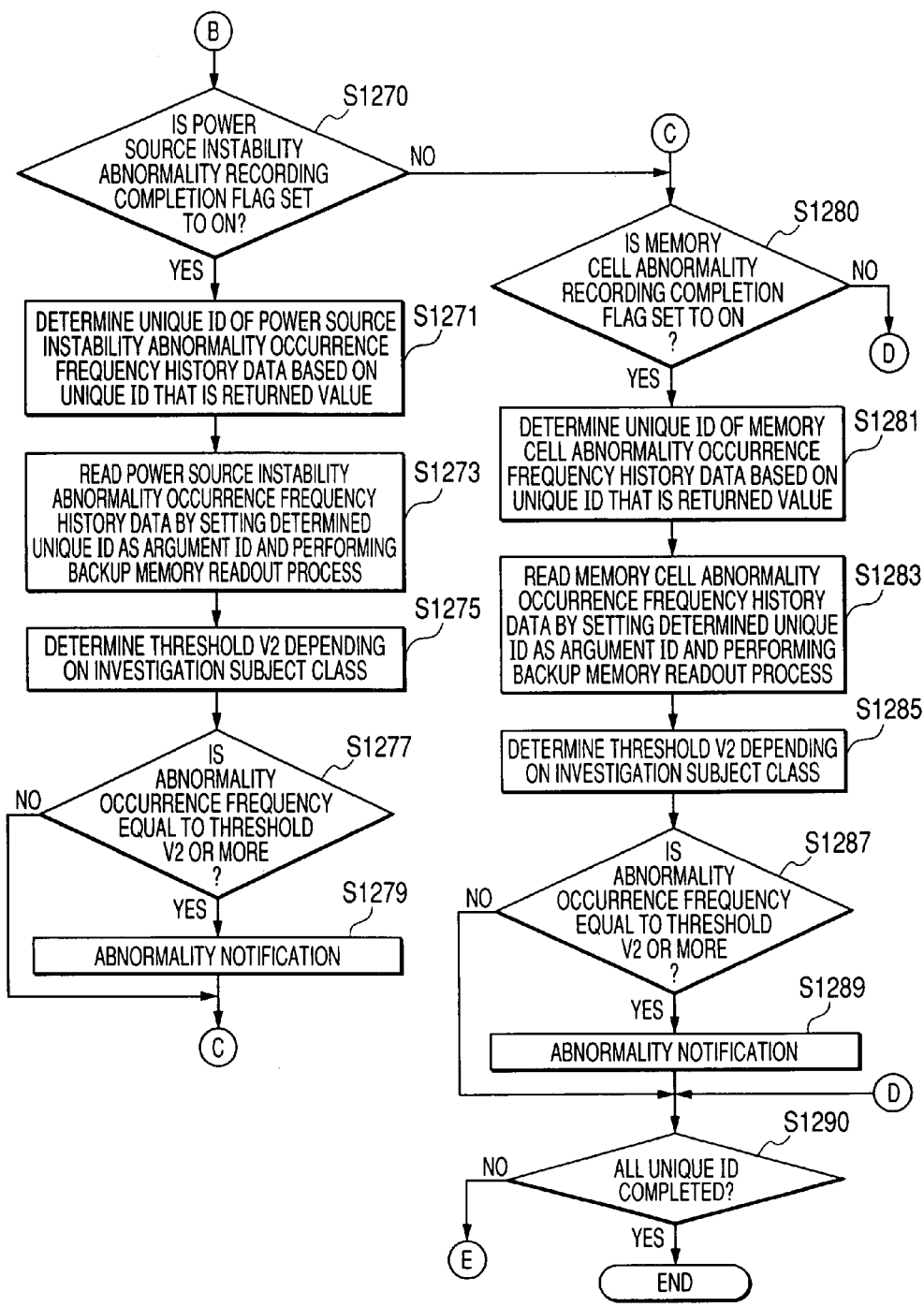
FIG. 17 is a flowchart of an abnormality monitoring process performed by the writing and reading control component.

Next, an abnormality monitoring process periodically performed by the writing and reading control component 11b to notify (warn) the vehicle occupant of the abnormality will be described. FIG. 16 and FIG. 17 are flowcharts of the abnormality monitoring process performed by the writing and reading control component 11b.

When the abnormality monitoring process is started, the writing and reading control component 11b selects one unselected unique ID as an investigation subject ID from among the unique ID assigned to each partition in the backup memory 13a and sets the selected unique ID as the investigation subject ID (S1210). Then, the writing and reading control component 11b judges whether any of the abnormality recording completion flags corresponding to the investigation subject ID is set to ON (S1220). In other words, the writing and reading control component 11b judges whether any of the RAM corruption abnormality recording completion flag, the writing abnormality recording completion flag, the power source instability abnormality recording completion flag, and the memory cell abnormality recording completion flag is set to ON.

When judged that any of the abnormality recording completion flags is set to ON (Yes, at S1220), the writing and reading control component 11b proceeds to S1230. When judged that all abnormality recording completion flags are set to OFF (No, at S1220), the writing and reading control component 11b proceeds to S1290.

After proceeding to S1230, the writing and reading control component 11b sets the same unique ID as the investigation subject ID as the history acquiring subject ID (S1230) and performs the abnormality history ID acquiring process shown in FIG. 14 using the set history acquiring subject ID (S1240).

After the abnormality history ID acquiring process is completed, the writing and reading control component 11b judges whether the RAM corruption abnormality recording completion flag of the investigation subject ID is set to ON (S1250). When judged that the RAM corruption abnormality recording completion flag is set to ON (Yes, at S1250), the writing and reading control component 11b proceeds to S1251.

After proceeding to S1251, the writing and reading control component 10b determines the unique ID of the partition storing the corresponding RAM corruption abnormality occurrence frequency history data, based on the unique ID outputted as the returned value at S1240. The writing and reading control component 11b reads the RAM corruption abnormality occurrence frequency history data from the backup memory 13a by setting the determined unique ID in the argument and performing the backup memory readout process (S1253).

Next, the writing and reading control component 11b sets a differing threshold V2 depending on the investigation subject ID, based on a second threshold setting table stored in the ROM 15 (S1255). FIG. 18 is an explanatory diagram of a configuration of the second threshold setting table stored in the ROM 15.

As shown in FIG. 18, the second threshold table includes values $V2[i,1]$ to $V2[i,4]$ to be set as the threshold V2 when respective abnormalities occur for each unique ID class (i=1 to 4). The abnormalities are the RAM corruption abnormality, the writing abnormality, the power source instability abnormality, and the memory cell abnormality. In the second threshold table, a unique ID class assigned to partitions within the data storing region set to an importance level equal to or more than the reference value D4, a unique ID class assigned to partitions within the data storing region R1 set to an importance level less than the reference value D4, a unique ID class assigned to partitions within the alternative data storing region R2, and a unique ID class assigned to partitions within the abnormality history storing region R3 are set as the unique ID class.

The writing and reading control component 11b sets the value corresponding with the investigation subject ID class, among the values $V2[1,1]$ to $V2[4,1]$, as the threshold V2, using the second threshold setting table configured as described above (S1255).

Then, the writing and reading control component 11b judges whether the occurrence frequency of the RAM corruption abnormality indicated by the RAM corruption abnormality occurrence frequency history data read at S1253 is equal to or more than the threshold V2 (S1257). When judged that the occurrence frequency of the RAM corruption abnormality is equal to or more than the threshold V2 (Yes, at S1257), the writing and reading control component 11b notifies the vehicle occupant of the RAM corruption abnormality by displaying a message indicating the RAM corruption abnormality in the display device 27 (S1259). The display device 27 is provided in an installation panel in front of the driver's seat. Then, the writing and reading control component 11b proceeds to S1260.

On the other hand, when judged that the occurrence frequency of the RAM corruption abnormality is less than the threshold V2 (No, at S1257), the writing and reading control component 11b proceeds to S1260 without performing the process at S1259.

When judged at S1250 that the RAM corruption abnormality recording completion flag of the investigation subject ID is set to OFF (No, at S1250), the writing and reading control component 11b proceeds to S1260 and judges whether the writing abnormality recording completion flag of the investigation subject ID is set to ON. When judged that the writing abnormality recording completion flag is set to ON (Yes, at S1260), the writing and reading control component 11*b* proceeds to S1261.

After proceeding to S1261, the writing and reading control component 11*b* determines the unique ID of the partition storing the corresponding writing abnormality occurrence frequency history data, based on the unique ID outputted as the returned value at S1240. The writing and reading control component 11*b* reads the writing abnormality occurrence frequency history data from the backup memory 13*a* by setting the determined unique ID in the argument and performing the backup memory readout process (S1263).

Then, the writing and reading control component 11*b* sets a differing threshold V2 depending on the investigation subject ID class, based on the second threshold setting table stored in the ROM 15 (S1265). In other words, the writing and reading control component 11*b* sets a value corresponding to the investigation subject ID class, among the values V2[1,2] to V2[4,2] written in the second threshold setting table, as the threshold V2.

Then, the writing and reading control component 11*b* judges whether the occurrence frequency of the writing abnormality indicated by the writing abnormality occurrence frequency history data read at S1263 is equal to or more than the threshold V2 (S1267). When judged that the occurrence frequency of the writing abnormality is equal to or more than the threshold V2 (Yes, at S1267), the writing and reading control component 11*b* notifies the vehicle occupant of the RAM corruption abnormality by displaying a message indicating the RAM corruption abnormality in the display device 27 (S1269). Then, the writing and reading control component 11*b* proceeds to S1270.

On the other hand, when judged at S1267 that the occurrence frequency of the writing abnormality is less than the threshold V2 (No, at S1267), the writing and reading control component 11*b* proceeds to S1270 without performing the process at S1269.

When judged at S1260 that the writing abnormality recording completion flag of the investigation subject ID is set to OFF (No, at S1260), the writing and reading control component 11*b* proceeds to S1270 and judges whether the power source instability abnormality recording completion flag of the investigation subject ID is set to ON. When judged that the power source instability abnormality recording completion flag is set to ON (Yes, at S1270), the writing and reading control component 11*b* proceeds to S1271.

After proceeding to S1271, the writing and reading control component 11*b* determines the unique ID of the partition storing the corresponding power source instability abnormality occurrence frequency history data, based on the unique ID outputted as the returned value at S1240. The writing and reading control component 11*b* reads the power source instability abnormality occurrence frequency history data from the backup memory 13*a* by setting the determined unique ID in the argument and performing the backup memory readout process (S1273).

Then, the writing and reading control component 11*b* sets a differing threshold V2 depending on the investigation subject ID class, based on the second threshold setting table stored in the ROM 15 (S1275). In other words, at S1275, the writing and reading control component 11*b* sets a value corresponding to the investigation subject ID class, among the values V2[1,3] to V2[4,3] written in the second threshold setting table, as the threshold V2.

Then, the writing and reading control component 11*b* judges whether the occurrence frequency of the power source instability abnormality indicated by the power source instability abnormality occurrence frequency history data read at S1273 is equal to or more than the threshold V2 (S1277). When judged that the occurrence frequency of the power source instability abnormality is equal to or more than the threshold V2 (Yes, at S1277), the writing and reading control component 11*b* notifies the vehicle occupant of the power source instability abnormality by displaying a message indicating the power source instability abnormality in the display device 27 (S1279). Then, the writing and reading control component 11*b* proceeds to S1280.

On the other hand, when judged at S1277 that the occurrence frequency of the power source instability abnormality is less than the threshold V2 (No, at S1277), the writing and reading control component 11*b* proceeds to S1280 without performing the process at S1279.

When judged at S1270 that the power source instability abnormality recording completion flag of the investigation subject ID is set to OFF (No, at S1270), the writing and reading control component 11*b* proceeds to S1280 and judges whether the memory cell abnormality recording completion flag of the investigation subject ID is set to ON. When judged that the memory cell abnormality recording completion flag is set to ON (Yes, at S1280), the writing and reading control component 11*b* proceeds to S1281.

After proceeding to S1281, the writing and reading control component 11*b* determines the unique ID of the partition storing the corresponding memory cell abnormality occurrence frequency history data, based on the unique ID outputted as the returned value at S1240. The writing and reading control component 11*b* reads the memory cell abnormality occurrence frequency history data from the backup memory 13*a* by setting the determined unique ID in the argument and performing the backup memory readout process (S1283).

Then, the writing and reading control component 11*b* sets a differing threshold V2 depending on the investigation subject ID class, based on the second threshold setting table stored in the ROM 15 (S1285). In other words, at S1285, the writing and reading control component 11*b* sets a value corresponding to the investigation subject ID class, among the values V2[1,4] to V2[2,4] written in the second threshold setting table, as the threshold V2.

Then, the writing and reading control component 11*b* judges whether the occurrence frequency of the memory cell abnormality indicated by the memory cell abnormality occurrence frequency history data read at S1283 is equal to or more than the threshold V2 (S1287). When judged that the occurrence frequency of the memory cell abnormality is equal to or more than the threshold V2 (Yes, at S1287), the writing and reading control component 11*b* notifies the vehicle occupant of the memory cell abnormality by displaying a message indicating the memory cell abnormality in the display device 27 (S1289). Then, the writing and reading control component 11*b* proceeds to S1290.

On the other hand, when judged at S1287 that the occurrence frequency of the memory cell abnormality is less than the threshold V2 (No, at S1287), the writing and reading control component 11*b* proceeds to S1290 without performing the process at S1289.

After proceeding to S1290, the writing and reading control component 11*b* judges whether all unique ID assigned to each partition in the backup memory 13*a* have been set as the investigation subject ID at S1210 and have undergone the procedures at S1220 and subsequent steps. When judged that all unique ID have not been set as the investigation subject ID (No, at S1290), the writing and reading control component 11*b* proceeds to S1210 and sets one of the unselected unique ID as the investigation subject ID. Then, the writing and reading control component 11b performs the procedures at S1220 and subsequent steps. When judged that all unique ID have been set as the investigation subject ID and have undergone the procedures at S1220 and subsequent steps (Yes, at S1290), the writing and reading control component 11b completes the abnormality monitoring process.

Next, a power-down process performed by the writing and reading control component 11b will be described. FIG. 19 is a flowchart of a power-down process performed by the writing and reading control component 11b. The power-down process is performed during the period between an OFF operation of the ignition switch SW performed by the ignition switch operating unit provided in the driver's seat and the ignition switch SW being turned OFF with a predetermined time lag.

When the power-down process is started, the writing and reading control component 11b first selects one unselected unique ID, from among the unique ID assigned to each partition in the data storing region R1 and the alternative data storing region R2, and sets the selected unique ID as the previous value writing subject ID (S1310).

Then, the writing and reading control component 11b identifies the importance level set to the previous value writing subject ID based on the importance table (S1320) and judges whether the identified importance level is equal to or more than the reference value D1 (S1330). However, when the previous value writing subject ID is the unique ID assigned to a partition in the alternative data storing region, the writing and reading control component 11b identifies the importance level set to the pre-change unique ID of the unique ID set as the previous value writing subject ID at S1320.

When judged that the importance level is less than the reference value D1, (No, at S1330), the writing and reading control component 11b proceeds to S1360. When judged that the importance level is equal to or more than the reference value D1 (Yes, at S1330), the writing and reading control component 11b proceeds to S1340. After proceeding to S1340, the writing and reading control component 11b judges whether any of the abnormality recording completion flags of the previous value writing subject ID are set to ON. In other words, the writing and reading control component 11b judges whether any of the RAM corruption abnormality recording completion flag, the writing abnormality recording completion flag, the power source instability abnormality recording completion flag, and the memory cell abnormality recording completion flag are set to ON.

When judged that any of the abnormality recording completion flags of the previous value writing subject ID are set to ON (Yes, at S1340), the writing and reading control component 11b proceeds to S1360 without performing the procedure at S1350. When judged that all abnormality recording completion flags of the previous value writing subject ID are set to OFF (No, at S1340), the writing and reading control component 11b proceeds to S1350. At S1350, the writing and reading control component 11b updates the control data corresponding to the previous value writing subject ID in the previous value table to the data (control data) recorded in the partition in the backup memory 13a corresponding to the previous value writing subject ID.

However, when the previous value writing subject ID is the unique ID assigned to the partition in the alternative data storing region, the writing and reading control component 11b updates the control data corresponding with the pre-change unique ID in the previous value table to data (control data) stored in the partition within the backup memory 13a corresponding to the previous value writing subject ID. When the procedure t S1350 is completed, the writing and reading control component 11b proceeds to S1360.

After proceeding to S1360, the writing and reading control component 11b judges whether all unique ID assigned to each partition in the data storing region R1 and the alternative data storing region R2 have been selected as the previous value writing subject ID and have undergone the procedures at S1320 and subsequent steps. When judged that all unique ID have nit been selected (No, at S1360), the writing and reading control component 11b proceeds to S1310, sets an unselected unique ID as the previous value writing subject ID, and performs the procedures at S1320 and subsequent steps.

At the same time, when judged that all unique ID have been selected as the previous value writing subject ID (Yes, at S1360), the writing and reading control component 11b proceeds to S1370. At S1370, the writing and reading control component 11b updates the content of the ID change table stored in the EEPROM 17 to the same content as that in the ID change table stored in the RAM 13. The, the writing and reading control component 11b backs up and saves the latest ID change table in the EEPROM 17.

Next, the writing and reading control component 11b proceeds to S1380 and updates the content of the abnormality history previous value table stored in the EEPROM 17 to the same content as that in the abnormality history storing region R3 in the backup memory 13a. The writing and reading control component 11b backs up and saves the each abnormality history data in the EEPROM 17. Then, the writing and reading control component 11b completes the power-down process.

Processes performed by the writing and reading control component 11b have been described above. However, the electronic control apparatus 1 according to the embodiment has a function that outputs abnormality history data generated and recorded by the writing and reading control component 11b.

Figure 20A:
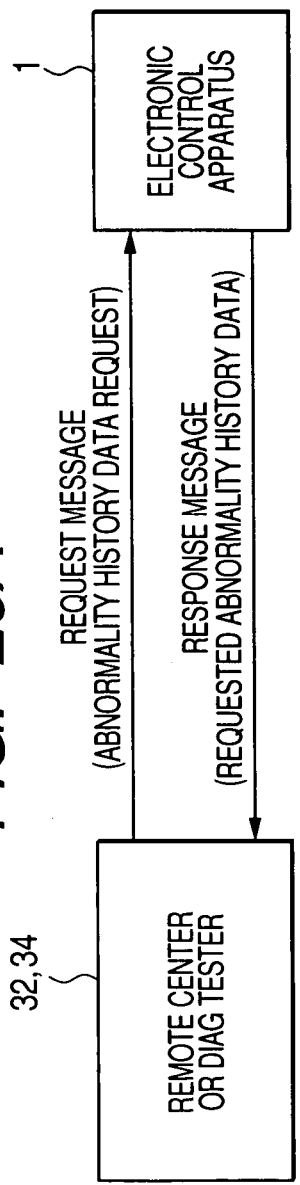
FIG. 20A is an explanatory diagram of transmission and reception of a message between an external device and the electronic control apparatus.

In other words, the communication interface 23 provided in the electronic control apparatus 1 according to the embodiment is connected to a wireless communication device 31 mounted on the vehicle, via the in-vehicle LAN. As shown in FIG. 20A, the electronic control apparatus 1 receives a request message requesting abnormality history data from an external remote center 32, via the wireless communication device 31. In response to the request, the electronic control apparatus 1 transmits a response message storing the requested abnormality history data to the remote center 32.

The communication interface 23 provided in the electronic control apparatus 1 according to the embodiment is also connected with an external connecting device 33 that receives a connection from a diagnostic tester (or diag tester) 34. The electronic control apparatus 1 receives a request message requesting abnormality history data from the diagnostic tester 34 connected to the external connecting device 33, via the external connecting device 33. In response to the request, the electronic control apparatus 1 transmits a response message storing the requested abnormality history data to the diagnostic tester 34.

Figure 20B:
FIG. 20B and FIG. 20C are explanatory diagrams of a configuration of a request message and a response message.
Figure 20C:
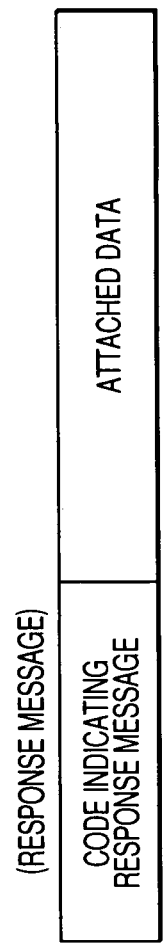
Figure 21:
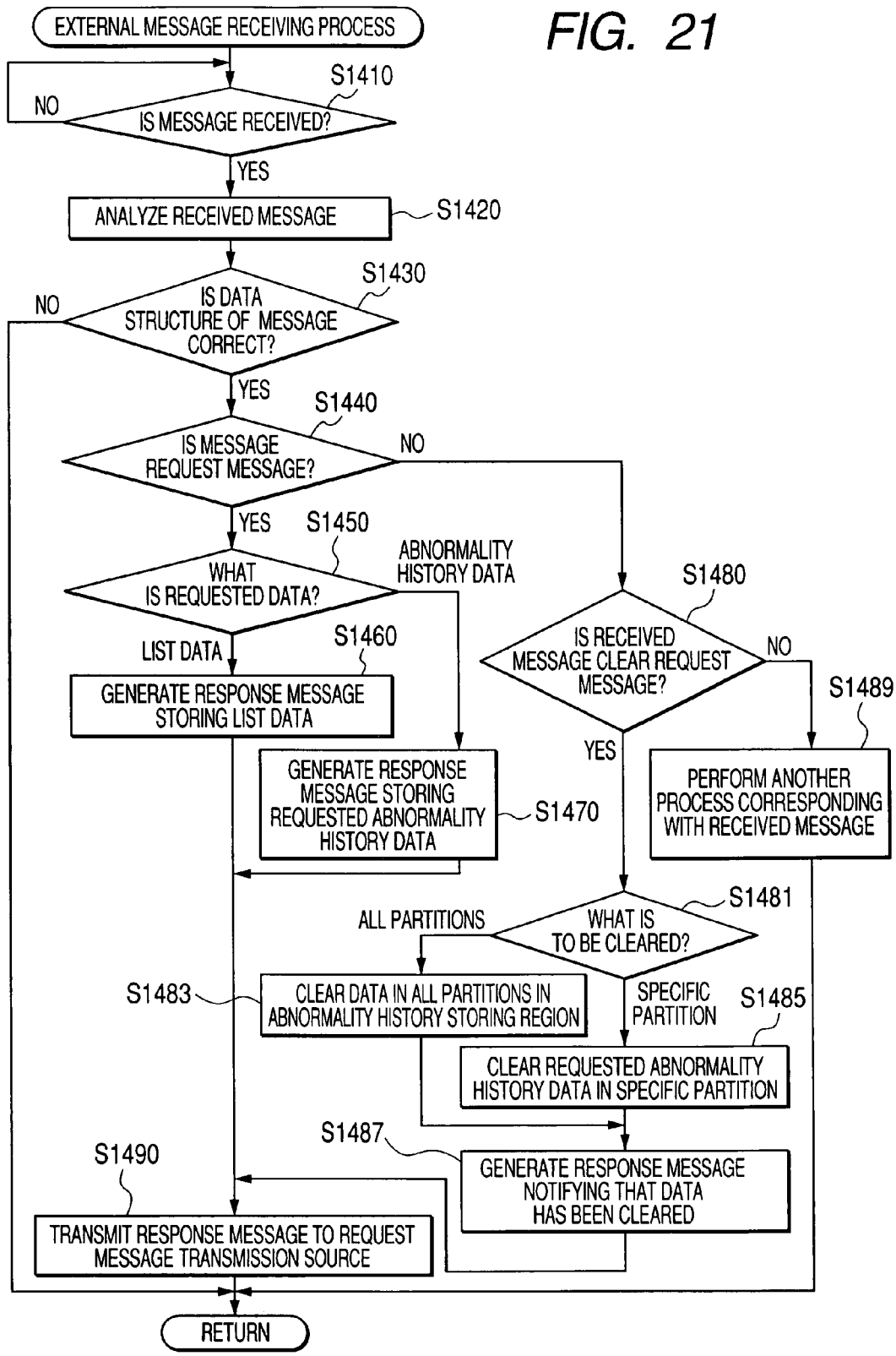
FIG. 21 is a flowchart of an external message receiving process performed by the CPU

FIG. 20A is an explanatory diagram of the transmission and reception of a message between the remote center 32 and the diagnostic tester 34, and the electronic control apparatus 1. FIG. 20B is an explanatory diagram of a configuration of a request message. FIG. 20C is an explanatory diagram of a configuration of a response message. FIG. 21 is a flowchart of an external message receiving process repeatedly performed by the CPU 11, based on a predetermined program stored in the ROM 15, after the ignition switch SW has been turned ON and the above-described power-ON process has been performed.

When the external message receiving process is started, the CPU 11 waits until a message is received from an external device (the remote center 32 or the diagnostic tester 34) via the communication interface 23 (S1410). When the message is received, the CPU 11 analyzes the received message (S1420) and judges whether the received message is a request message having a correct data structure (S1430). As shown in FIG. 20B, the request message has a structure including code information indicating that the message is a request message, code information indicating the request type, and attachment data.

When the received message is a request message having the structure shown in FIG. 20B, the CPU 11 judges that the received message is a request message having the correct data structure (Yes, at S1430) and proceeds to S1440. When judged that the received message is not a request message having the correct data structure (No, at S1430), the CPU 11 temporarily completes the external message receiving process. Then, the CPU 11 returns to S1410.

After proceeding to S1440, the CPU 11 judges whether the received message is a data request message, based on the code information expressing the type of request stored in the received message. When judged that the received message is a data request message (Yes, at S1440), the CPU 11 identifies the requested data based on the attachment data at S1450. Specifically, when the attachment data shows the value "0xFFFF", the CPU 11 identifies the requested data as being list data including a list of unique ID indicated by each abnormality occurrence location history data stored in the abnormality history storing region R3. After identifying that the requested data is the list data, the CPU 11 proceeds to S1460 and generates a response message storing the list data. As shown in FIG. 20C, the response message has a structure including code information indicating that the message is a response message and attachment data.

In other words, when the unique ID indicated by the abnormality occurrence location history data stored in the abnormality history storing region R3 is "ID1234" and "ID1345", the CPU 11 generates attachment data indicating the values "1234" and "1345". The CPU 11 generates a response message in which the code information for the response message and the attached data are arrayed (S1460).

Then, the CPU 11 proceeds to S1490 and transmits the response message to the request message transmission source device, via the communication interface 23. Then, the CPU 11 completes the external message receiving process.

At the same time, when the attachment data in the received message indicates a value other than "0xFFFF", the CPU 11 identifies the requested data to be the abnormality history data at S1450. At S1470, the CPU 11 generates a response message having the following attachment data. The attachment data is abnormality history data having the abnormality occurrence location history data indicating the unique ID matching the value indicated by the attachment data. In other words, the CPU 11 generates a response message including the occurrence frequency of respective abnormalities that has occurred in the partition in the backup memory 13*a* to which the unique ID indicated by the attachment data in the request message is assigned. The abnormalities are the RAM corruption abnormality, the writing abnormality, the power source instability abnormality, and the memory cell-abnormality.

Then, the CPU 11 transmits the generated response message to the request message transmission source device, via the communication interface 23 (S1490) and completes the external message receiving process.

When judged at S1440 that the received message is not the data request message, based on the code information stored in the request message that indicates the type of request, the CPU 11 judges whether the received message is a clear request message that requests for data to be cleared (S1480). When judged that the received message is the clear request message (Yes, at S1480), the CPU 11 identifies the designated partition to be cleared, based on the attachment data in the received message (S1481).

Specifically, when the attachment data shows the value "0xFFFF", the CPU 11 identifies the designated partition to be cleared to be all partitions within the abnormality history storing region R3 and clears the data in all partitions within the abnormality history storing region R3 at S1483. The CPU 11 proceeds to S1487 and generates a response message including a message that the data has been cleared. Then, the CPU 11 transmits the response message to the request message transmission source device, via the communication interface 23 (S1490) and completes the external message receiving process.

At the same time, when the attachment data in the received message shows a value other than "0xFFFF", the CPU 11 identifies the partition to be cleared, designated at S1481, to be a specific partition. At S1485, the CPU 11 clears the data in each partition storing abnormality history data having the abnormality occurrence location history data indicating the unique ID matching the value shown in the attachment data. The CPU 11 proceeds to S1487 and generates a response message including a message that the data has been cleared. Then, the CPU 11 transmits the response message to the request transmission source device, via the communication interface 23 (S1490), and completes the external message receiving process.

When judged at S1480 that the received message is not a clear request message (No, at S1480), the CPU 11 proceeds to S1489. At S1489, the CPU 11 performs a process corresponding to the request content shown in the received message and completes the external message receiving process.

The electronic control apparatus 1 according to the embodiment has been described above. When an abnormality is detected in the backup memory 13*a*, the electronic control apparatus 1 according to the embodiment updates the abnormality occurrence frequency history data in the abnormality history storing region R3 in the backup memory 13*a*, stored in correlation with the abnormality occurrence location history data indicating the unique ID of the partition in which the detected abnormality has occurred. As a result, the abnormality occurrence frequency is correlated with the information on the partition in which the abnormality has occurred and recorded (see FIG. 13). Furthermore, during power-down, the data within the abnormality history storing region R3 is written in the EEPROM 17 so that the abnormality occurrence frequency is not reset, even when the car battery 25 is removed and attached (see FIG. 19).

The electronic control apparatus 1 according to the embodiment includes the communication interface 23 that allows communication with a device outside of the vehicle. Based on the content of the abnormality history recorded by the abnormality history recording process or the like, the electronic control apparatus 1 transmits the data (response message) indicating the occurrence frequency of the abnormality that has occurred in the backup memory 13*a* to the device outside of the vehicle, via the communication interface 23 (see FIG. 21).

In this way, the electronic control apparatus 1 according to the embodiment stores the abnormality occurrence frequency information regardless of the ON/OFF operation of the ignition switch, accumulates and stores the abnormality occurrence frequency for over a long period of time, and provides the stored information to the diagnostic tester 34, the remote center 32, and the like. Therefore, compared to a conventional device, the electronic control apparatus 1 according to the embodiment can provide detailed information that is useful when judging whether the abnormality is a permanent abnormality or an incidental abnormality.

In other words, according to the embodiment, the user (the vehicle occupant, maintenance worker, and the like) can accurately grasp the occurrence frequency of the abnormality occurring in the backup memory 13*a*, via the diagnostic tester 34 and the like, and take an appropriate measure to fix the abnormality. Specifically, when the abnormality is a permanent abnormality, the user can take a measure such as exchanging hardware. When the abnormality is an incidental abnormality, the user can handle the abnormality without exchanging the hardware.

In response to a data request message received from an external device, via the communication interface 23, the electronic control apparatus 1 according to the embodiment transmits the abnormality history data to the request source device. As a result, the abnormality history data can be efficiently provided externally.

The electronic control apparatus 1 according to the embodiment receives a designation of a unique ID by a received data request message and transmits a response message indicating the abnormality occurrence frequency in the partition corresponding with the designated unique ID to the data request source device. In other words, the electronic control apparatus 1 according to the embodiment can selectively provide the user with the requested abnormality occurrence frequency information. The user can receive the required abnormality history information and efficiently investigate the abnormality.

Depending on the content of the abnormality, the cause of the abnormality can be more efficiently investigated if a replication test is performed and the abnormality history data generated during the test is analyzed. Therefore, the electronic control apparatus 1 according to the embodiment includes a function for clearing the abnormality history data when a clear request message is received from the external device, via the communication interface 23. Therefore, the user can perform the replication test after clearing the abnormality history data, via the diagnostic tester 34 or the like, thereby efficiently investigating the cause of the abnormality.

The electronic control apparatus 1 according to the embodiment selectively clears the abnormality history data having the abnormality occurrence location history data indicating the same value as the unique ID designated in the received clear request message. Therefore, the user can selectively clear only the data that required clearing, without clearing the data that does not require clearing, via the diagnostic tester 34 or the like.

The electronic control apparatus 1 according to the embodiment updates the RAM corruption abnormality occurrence frequency history data, the writing abnormality occurrence frequency history data, the power source instability abnormality occurrence frequency history data, and the memory cell abnormality occurrence frequency history data and records the respective abnormality occurrence frequencies of the abnormalities. Therefore, the user can grasp the occurrence frequencies of various abnormalities and take appropriate measures against various abnormalities, via the diagnostic tester 34 or the like.

Even if the abnormality occurrence frequency is increased by the number of detections during one operation period, the information most likely becomes meaningless information unless the user understands the details of the operation state of the vehicle. Therefore, the electronic control apparatus 1 according to the embodiment increases the abnormality occurrence frequency by one, only once, for each abnormality occurrence partition and each abnormality type and records the occurrence frequency of each component and each abnormality type, regarding each abnormality that has occurred during a period between power-ON and power-down of the electronic control apparatus 1 by an operation performed by the vehicle occupant (one operation period), using the abnormality recording completion flag. Therefore, the electronic control apparatus 1 according to the embodiment can efficiently record the abnormality occurrence frequency and suppress the processing load placed on the CPU 11.

According to the embodiment, the abnormality-judgment-included writing process judges whether the control data is overwritten with the intended control data when the control data within the backup memory 13*a* is updated, thereby detecting the writing abnormality in the control data. When the writing abnormality is detected, the content of the fail-safe process is switched depending on the occurrence partition of the writing abnormality.

In other words, when the writing abnormality has occurred in the partition in the data storing region R1 and the control data stored in the partition has a high importance level, a fail-safe process for securing the storage region for the control data in the alternative data storing region R2 is performed. When the control data stored in the partition in which the writing abnormality has occurred has a low importance level, a fail-safe process for outputting an initial value of the control data as a returned value when reading the control data, without securing the storage region for the control data in the alternative data storing region R2, is performed. Therefore, according to the embodiment, the problem of the writing abnormality can be appropriately solved within the electronic control apparatus 1, without unnecessarily increasing the alternative data storing region R2.

According to the embodiment, the control data having a high importance level is assigned a partition in the alternative data storing region R2 when the writing abnormality occurs. The timing at which the partition is assigned is adjusted based on the occurrence frequency of the writing abnormality.

In other words, the electronic control apparatus 1 according to the embodiment switches the content of the fail-safe process performed when the writing abnormality is detected, depending on the occurrence frequency of the abnormality that has occurred in the same partition in the past. Even when a writing abnormality of the control data occurs, if the occurrence frequency of the abnormality is less than a threshold V1, the electronic control apparatus 1 outputs the initial value of the control data as a returned value when reading the control data, without securing the storage region for the control data in the alternative data storing region R2. If the occurrence frequency of the abnormality is equal to or more than the threshold V1, the writing abnormality is determined to be a permanent abnormality. The electronic control apparatus 1 secures a storage region for the control data in the alternative data storing region R2. Therefore, according to the embodiment, the alternative data storing region R2 is not assigned to the control data in the partition in which an incidental writing abnormality has occurred. Thus, the alternative data storing region R2 can be effectively used.

The electronic control apparatus 1 according to the embodiment detects illegal data in each control data, based on check data, and records the occurrence frequency of the abnormality. In addition, the electronic control apparatus 1 performs a process that updates the control data in which the illegal data has been detected with the control data prior to the occurrence of the illegal data, as the fail-safe process for illegal data. Therefore, the abnormality caused by illegal data can be fixed within the electronic control apparatus 1.

When grouping a group of control data that requires mutual consistency by section numbers and updating the control data from which illegal data has been detected to the control data prior to the occurrence of the illegal data, the electronic control apparatus 1 according to the embodiment updates each control data belonging to the same group from which the illegal data has been detected to the value prior to the occurrence of the illegal data, simultaneously with the control data from which the illegal data has been detected. Therefore, illegal data can be handled while maintaining consistency among each control data, thereby preventing unstable vehicle control caused by inconsistencies among the control data.

The electronic control apparatus 1 according to the embodiment backs up and saves the control data of a partition from which an abnormality has not been detected in the EEPROM 17. When illegal data is detected, the electronic control apparatus 1 reconstructs the control data of the partition from which the illegal data has been detected, using the value of the corresponding component that has backed up and saved (previous value). Therefore, the vehicle can be appropriately controlled based on the learning results, even when the illegal data occurs.

The electronic control apparatus 1 according to the embodiment includes check data in the control data. Therefore, when the data within the backup memory 13a is volatilized by the removal/attachment of the car battery 25, illegal data is detected in each partition within the backup memory 13a. However, according to the embodiment, the electronic control apparatus 1 performs illegal data detection operation on each control data at power-ON. When a number of illegal data that is equal to or more than a predetermined amount is detected through the detection operation, the electronic control apparatus 1 judges that the car battery has been removed or attached and does not update the abnormality occurrence frequency based on the illegal data. Therefore, the abnormality detection caused by the removal/attachment if the car battery 25 can be ignored. In addition, the vehicle occupant, the worker, and the like can be prevented from mistakenly thinking that an abnormality has been detected in the electronic control apparatus due to the notification of the abnormality.

According to the embodiment, in the backup memory writing process, the backup memory readout process is performed before the specific data from the execution instruction source is written in the partition of the corresponding unique ID. As a result, the illegal data detection operation is performed on the control data to be updated, before the writing operation to the partition (update of the data in the partition, described above). Therefore, even when the illegal data occurs in the control data before data update, the electronic control apparatus 1 according to the embodiment can detect all illegal data abnormalities without fail before the abnormalities are fixed by the data update, thereby accurately recording the abnormality history regarding the illegal data.

The electronic control apparatus 1 according to the embodiment backs up and saves the control data having a high importance level, among the control data of a partition from which an abnormality has not been detected, in the EEPROM 17. When a writing abnormality is detected in the partition, the electronic control apparatus 1 outputs the value of the corresponding partition that has been backed up and saved (previous value) as the result in response to the readout instruction, as the fail-safe process for the writing abnormality. Therefore, the vehicle can be appropriately controlled based on the learning results, even when the writing abnormality occurs.

The electronic control apparatus 1 according to the embodiment judges whether the notification of the abnormality is required to be given to the vehicle occupant, based on the abnormality occurrence frequency indicated by the abnormality history data. When judged that the notification is required, the electronic control apparatus 1 notifies the vehicle occupant of the abnormality, via the display device 27 in the installation panel. Therefore, the vehicle occupant can be warned of the abnormality at an early stage when an abnormality having a high occurrence frequency is detected and not warned of the abnormality when an incidental abnormality occurs. Therefore, the electronic control apparatus does not cause the vehicle occupant alarm.

According to the embodiment, the electronic control apparatus 1 sets a differing threshold V2, depending on the class of the partition in which the abnormality has occurred, and judges whether the notification of the abnormality is required to be given to the vehicle occupant, based on the threshold V2. Therefore, the vehicle occupants can be appropriately notified of abnormalities requiring notification.

The detecting component according to the embodiment is actualized by the procedures at S230 to S255, S630 to S670, S750 to S765, and S1110 to S1140. The recording component is actualized by the abnormality history recording process and the procedures at S1150 to S1190, and S1380. The transmitting unit is actualized by the external message receiving means, particularly the procedures at S1470 and S1490. The clearing component is actualized by the external message receiving means, particularly the procedure at S1485.

The fail-safe processing component is actualized by the procedures at S260, S280 to S290, and S780 to S785. The backup processing unit is actualized by the procedures at S1310 to S1360. The removal/attachment determining component is actualized by the procedure at S140. The warning requirement determining component and the warning device controlling means are actualized by the abnormality monitoring process.

The electronic control apparatus of the present invention is not limited to the present embodiment and various embodiments are possible. For example, in the abnormality monitoring process according to the embodiment, the electronic control apparatus 1 notifies the vehicle occupant in the form of a message, via the display device 27 provided in the installation panel. However, in the abnormality monitoring process, the electronic control apparatus 1 can notify the vehicle occupant by controlling and illuminating a warning lamp provided in the installation panel, in place of the display device 27.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An electronic control apparatus used in a vehicle, comprising:
a volatile memory configured to store control data for control necessary to the vehicle, each control data being stored in the volatile memory together with a first unique identifier (ID) that is assigned to a region of the volatile memory where the control data is stored and is associated with a section number, the section number representing a group of data, to which the control data belongs, to be overwritten by previous or initial data simultaneously when an abnormality occurs in the volatile memory;
a control component configured to perform the control necessary to the vehicle using the control data stored in the volatile memory;
an update component configured to update the control data stored in the volatile memory on the basis of a result of the control performed by the control component;
a detecting component configured to detect the abnormality occurring in the volatile memory;
a recording component configured to record, into the volatile memory, a history of the abnormality detected by the detecting component, including information indicating a region of the volatile memory in which the abnormality occurs, the history of the abnormality being stored in the volatile memory together with a second unique identifier (ID) that is assigned to a region of the volatile memory where the history of the abnormality is stored and is associated with a section number, the section number representing a group of data, to which the history of the abnormality belongs, to be overwritten by previous or initial data simultaneously when the abnormality occurs in the volatile memory, whereby the history of the abnormality stored in the volatile memory can be correlated with the control data stored in the volatile memory through the first and second unique identifiers that are associated with the same section number;
a communication interface communicable with an external device; and
a transmitting unit configured to generate a transmission signal indicating the history of the abnormality in the volatile memory on the basis of information indicating the history of the abnormality recorded in the volatile memory by the recording component and transmit the transmission signal to the external device via the communication interface,
wherein the volatile memory is configured to powered by a battery mounted in the vehicle and to hold data including the control data and the history of the abnormality by updating the data while the battery is being mounted in the vehicle.

2. The electronic control apparatus of claim 1, wherein the transmitting unit is configured to:
respond to a signal requesting the transmission signal, the transmission requesting signal being issued by the external device, by generating the transmission signal indicating the history of the abnormality; and then
transmit the generated transmission signal via the communication interface to the external device that requests the transmission signal.

3. The electronic control apparatus of claim 2, wherein the transmission requesting signal includes information specifying the region of the volatile memory in which the abnormality occurs; and
the transmitting unit is configured to:
respond to a signal requesting the transmission signal, the transmission requesting signal being issued by the external device, by generating the transmission signal indicating, of the history of the abnormality recorded by the recording component, the history of the abnormality occurring in the region specified by the transmission requesting signal; and
transmit the generated transmission signal via the communication interface to the external device that requests the transmission signal.

4. The electronic control apparatus of claim 1, comprising
a clearing component configured to clear the history of the abnormality recorded by the recording component in response to reception of a signal requesting clearance of the history of the abnormality from the external device via the communication interface.

5. The electronic control apparatus of claim 4, wherein
the clearance requesting signal includes information specifying the region of the volatile memory in which the abnormality occurs; and
the clearing component is configured to respond to the clearance requesting signal by clearing, of the history of the abnormality recorded by the recording component, the history of the abnormality correlated with the information indicating the region of the volatile memory in which the abnormality occurred and which is specified by the clearance requesting signal.

6. The electronic control apparatus of claim 1, wherein
the recording component comprises is configured to record a frequency of occurrence of the abnormality in correlation with the information indicating the region of the volatile memory in which the abnormality occurs, the frequency serving as the history of the abnormality.

7. The electronic control apparatus of claim 6, wherein
the detecting component is configured to detect plural types of abnormalities; and
the recording component is configured to record the frequency of occurrence of each type of abnormality for each region of the volatile memory where the type of abnormality is detected by the detecting component.

8. The electronic control apparatus of claim 7, wherein
the recording component is configured to increment the frequency of occurrence of each type of abnormality for each region of the volatile memory where the type of abnormality is detected by the detecting component, only once during a period of time from a start of the control responsively to an operation done by an occupant in the vehicle to an end of the control,
wherein the recording component is configured to record the frequency of occurrence of each type of abnormality for each region of the volatile memory where the type of abnormality is detected by the detecting component.

9. The electronic control apparatus of claim 1, comprising
a fail-safe processing component configured to perform a fail-safe process for the abnormality detected by the detecting component.

10. The electronic control apparatus of claim 9, wherein
the fail-safe processing component is configured to control a content of the fail-safe process depending on which region of the volatile memory causes the abnormality.

11. The electronic control apparatus of claim 9, wherein
the fail-safe processing component is configured to control a content of the fail-safe process depending on a frequency of occurrence of the abnormality caused, in the past, at a region of volatile memory which is the same as a region in which the abnormality is detected.

12. The electronic control apparatus of claim 9, wherein
the fail-safe processing component is configured to control a content of the fail-safe process depending on a region of the volatile memory in which the abnormality is caused and a frequency of occurrence of the abnormality caused in the same region of the volatile memory in the past.

13. The electronic control apparatus of claim 9, wherein
the control data includes check data serving as data for detecting illegal data;
the detecting component is configured to detect, as one kind of the abnormality, the illegal data in the control data stored in the volatile memory on the basis of the check data; and
the fail-safe processing component is configured to perform, as the fail-safe process for the illegal data, a process to update the control data in which the illegal data is detected to the control data which were present before an occurrence of the illegal data.

14. The electronic control apparatus of claim 13, wherein
the control data to be stored in the volatile memory is grouped into a plurality of control data type by type; and
the fail-safe processing component is configured to perform, as the fail-safe process for the illegal data, not only a process to update the control data in which the illegal data is detected to the control data which were present before an occurrence of the illegal data but also a process to update the control data belonging to a group in the volatile memory in which the illegal data is detected to control data being paired to the control data which were present before an occurrence of the illegal data.

15. The electronic control apparatus of claim 9, wherein
the detecting component is configured to detect the abnormality being caused in writing the control data by determining whether or not the control data has been rewritten into control data to be desired when the data is updated in the volatile memory; and
the fail-safe processing component is configured to perform, as the fail-safe process for the abnormality being caused in writing the control data, a process to change a region of the volatile memory in which the control data found to be abnormal in writing thereof is written to another region of the volatile memory.

16. The electronic control apparatus of claim 9, wherein
the detecting component is configured to detect the abnormality being caused in writing the control data by determining whether or not the control data has been rewritten into control data to be desired when the data is updated in the volatile memory; and
the fail-safe processing component is configured to respond to issuance of a read command of the control command found to be abnormal in writing thereof, by performing, as the fail-safe process for the abnormality being caused in writing the control data, a process to output initial values of the control data found to be abnormal in writing thereof.

17. The electronic control apparatus of claim 1, wherein
the control data includes check data serving as data for detecting illegal data; and
the detecting component is configured to detect, as one kind of the abnormality, the illegal data in the control data stored in the volatile memory on the basis of the check data.

18. The electronic control apparatus of claim 17, wherein
the detecting component is configured to detect illegal data from the control data to be updated in the volatile memory, prior to the update of the control data.

19. The electronic control apparatus of claim 1, wherein
the control data includes check data serving as data for detecting illegal data;
the detecting component is configured to detect, as one kind of the abnormality, the illegal data in the control data stored in the volatile memory on the basis of the check data at start of the control,
the electronic control apparatus further comprising a determining component configured to determine whether or not the battery has been detached from the vehicle on the basis of a result performed by the detecting component at the start of the control,
wherein the recording component is free from recording information indicating the illegal data detected by the detecting component at the start of the control when the determining component determines that the battery has been detached from the vehicle.

20. The electronic control apparatus of claim 1, wherein
the detecting component is configured to detect the abnormality being caused in writing the control data by determining whether or not the control data is rewritten into control data to be desired when the data is updated in the volatile memory.

21. The electronic control apparatus of claim 1, further comprising
a warning determining component configured to determine whether or not it is required to inform an occupant in the vehicle of an occurrence of the abnormality on the basis of the history recorded by the recoding unit; and
a warning controlling unit configured to control a warning device mounted in the vehicle so that the occurrence of the abnormality is informed, when the warning determining component determines that it is required to inform the occupant of the occurrence of the abnormality.

22. The electronic control apparatus of claim 21, wherein
the warning determining component is configured to determine whether or not it is required to inform the occupant of the occurrence of the abnormality based on different criteria assigned to different regions of the volatile memory in each of which the abnormality occurs.

23. An electronic control apparatus used in a vehicle, comprising:
a volatile memory configured to store control data for control necessary to the vehicle, each control data being stored in the volatile memory together with a first unique identifier (ID) that is assigned to a region of the volatile memory where the control data is stored and is associated with a section number, the section number representing a group of data, to which the control data belongs, to be overwritten by previous or initial data simultaneously when an abnormality occurs in the volatile memory;
a control component configured to perform the control necessary to the vehicle using the control data stored in the volatile memory;
an date component configured to update the control data stored in the volatile memory on the basis of a result of the control performed by the control component;
a detecting component configured to detect the abnormality occurring in the volatile memory;
a non-volatile memory in which the data is stored in an electrically rewritable state;
a recording component configured to record, into the non-volatile memory, a history of the abnormality detected by the detecting component, including information indicating a region of the volatile memory in which the abnormality occurs, the history of the abnormality being stored in the non-volatile memory together with a second unique identifier (ID) that is assigned to a region of the non-volatile memory where the history of the abnormality is stored and is associated with a section number, the section number representing a group of data, to which the history of the abnormality belongs, to be overwritten by previous or initial data simultaneously when the abnormality occurs in the volatile memory, whereby the history of the abnormality stored in the non-volatile memory can be correlated with the control data stored in the volatile memory through the first and second unique identifiers that are associated with the same section number;

a communication interface communicable with an external device; and a transmitting unit configured to generate a transmission signal indicating the history of the abnormality in the non-volatile memory on the basis of information indicating the history of the abnormality recorded in the non-volatile memory by the recording component and transmit the transmission signal to the external device via the communication interface.

24. The electronic control apparatus of claim 23, further comprising a backup processing unit configured to back up, into the non-volatile memory, control data stored in regions of the volatile memory which are found to be normal by the detecting component; and a fail-safe processing component configured to perform a fail-safe process for the abnormality detected by the detecting component, wherein the control data includes check data serving as data for detecting illegal data;

the detecting component is configured to detect, as one kind of the abnormality, the illegal data in the control data stored in the volatile memory on the basis of the check data; and the fail-safe processing component is configured to perform, as the fail-safe process for the illegal data, a process to update the control data found to be as illegal data by the detecting component to the control data found to be normal and detected and stored in the non-volatile memory before the occurrence of the abnormality.

25. The electronic control apparatus of claim 23, wherein the control data includes check data serving as data for detecting illegal data;

the detecting component is configured to detect, as one kind of the abnormality, the illegal data in the control data stored in the volatile memory on the basis of the check data at start of the control;

the volatile memory is configured to be powered by a battery mounted in the vehicle and to memorize data including the control data when the battery is mounted in the vehicle, the electronic control apparatus further comprising a determining component configured to determine whether or not the battery has detached from the vehicle on the basis of a result performed by the detecting component at the start of the control, wherein the recording component is free from recording information indicating the illegal data detected by the detecting component at the start of the control when the determining component determines that the battery has been detached from the vehicle.

26. The electronic control apparatus of claim 23, further comprising a backup processing unit configured to back up, into the non-volatile memory, control data stored in regions of the volatile memory which are found to be normal by the detecting component; and a fail-safe processing component configured to perform a fail-safe process for the abnormality detected by the detecting component, wherein the detecting component is configured to detect the abnormality being caused in writing the control data by determining whether or not the control data has been rewritten into control data to be desired when the data is updated in the volatile memory; and the fail-safe processing component is configured to respond to issuance of a read command of the control command found to be abnormal in writing thereof, by performing, as the fail-safe process for the abnormality being caused in writing the control data, a process to output the control data stored in the non-volatile memory by the backup unit prior to the detection of the abnormality.

27. The electronic control apparatus of claim 23, wherein the transmitting unit is configured to respond to a signal requesting the transmission signal, the transmission requesting signal being issued by the external device, by generating the transmission signal indicating the history of the abnormality; and then transmit the generated transmission signal via the communication interface to the external device that requests the transmission signal.

28. The electronic control apparatus of claim 23, further comprising a clearing component configured to clear the history of the abnormality recorded in the recording component in response to reception of a signal requesting clearance of the history of the abnormality from the external device via the communication interface.

29. The electronic control apparatus of claim 23, further comprising a fail-safe processing component configured to perform a fail-safe process for the abnormality detected by the detecting component.

30. The electronic control apparatus of claim 23, wherein the control data includes check data serving as data for detecting illegal data; and the detecting component is configured to detect, as one kind of the abnormality, the illegal data in the control data stored in the volatile memory on the basis of the check data.

31. The electronic control apparatus of claim 23, further comprising a warning determining component configured to determine whether or not it is required to inform an occupant in the vehicle of an occurrence of the abnormality on the basis of the history recorded by the recoding unit; and a warning controlling unit configured to control a warning device mounted in the vehicle so that the occurrence of the abnormality is informed, when the warning determining component determines that it is required to inform the occupant of the occurrence of the abnormality.

* * * * *

UNITED STATES PATENT AND TRADEMARK OFFICE
CERTIFICATE OF CORRECTION

| | | |
|---|---|---|
| PATENT NO. | : 8,849,504 B2 | Page 1 of 1 |
| APPLICATION NO. | : 11/701555 | |
| DATED | : September 30, 2014 | |
| INVENTOR(S) | : Watanabe | |

It is certified that error appears in the above-identified patent and that said Letters Patent is hereby corrected as shown below:

In the Claims

At col. 38, line 57, Claim 23, please amend the following paragraph as follows:

an update component configured to update the control data stored in the volatile memory on the basis of a result of the control performed by the control component;

Signed and Sealed this
Seventeenth Day of March, 2015

Michelle K. Lee
*Director of the United States Patent and Trademark Office*